US00RE39395E

(19) United States
(12) Reissued Patent
Rangan et al.

(10) Patent Number: US RE39,395 E
(45) Date of Reissued Patent: Nov. 14, 2006

(54) DATA COMMUNICATION NETWORK WITH TRANSFER PORT, CASCADE PORT AND/OR FRAME SYNCHRONIZING SIGNAL

(75) Inventors: Geetha N. K. Rangan, Los Altos Hills, CA (US); Debra J. Worsley, San Jose, CA (US); Richard Thaik, San Jose, CA (US); Brian C. Edem, Saratoga, CA (US)

(73) Assignee: Negotiated Data Solutions LLC, Chicago, IL (US)

(21) Appl. No.: 09/173,582

(22) Filed: Oct. 15, 1998

Related U.S. Patent Documents

Reissue of:
(64) Patent No.: 5,566,169
Issued: Oct. 15, 1996
Appl. No.: 08/147,359
Filed: Nov. 1, 1993

U.S. Applications:
(63) Continuation-in-part of application No. 07/969,916, filed on Nov. 2, 1992, now abandoned.

(51) Int. Cl.
*H04J 3/14* (2006.01)

(52) U.S. Cl. ..... 370/366; 370/352; 370/426
(58) Field of Classification Search ..... 340/825.05, 340/825.5, 825.51, 825.52, 825.21; 370/389, 370/400, 401, 256, 257, 254, 255, 258, 402, 370/403, 404, 405, 406, 407, 408, 465, 468, 370/522, 524, 535, 537, 442, 366, 352, 426
See application file for complete search history.

(56) References Cited

U.S. PATENT DOCUMENTS 3,619,505 A 11/1971 Melle ..... 375/110
3,835,260 A 9/1974 Prescher et al. ..... 379/237

(Continued)

FOREIGN PATENT DOCUMENTS

| | | |
|---|---|---|
| EP | 0131662 | 1/1985 |
| EP | 0318332 | 5/1989 |
| JP | A1 254035 | 10/1989 |
| JP | A1 297926 | 12/1989 |
| JP | A5 175977 | 7/1993 |
| WO | WO A8805233 | 7/1988 |
| WO | WO A8911183 | 11/1989 |

OTHER PUBLICATIONS

A Communication System Proposal Presented to Representatives of Apple Computer on Mar. 5, 1990.
A disclosure of a communication system was presented at the IEEE 802.9, Standards Meeting on Nov. 8–12, 1992. The pages entitled: "Multi–Media Applications are Ready".

(Continued)

*Primary Examiner*—Dang Ton
(74) *Attorney, Agent, or Firm*—Loudermilk & Associates

(57) ABSTRACT

A data communication system, such as a local area network, is provided with a capability of transmitting isochronous data. Preferably the system conveys both isochronous data and non-isochronous data by time-multiplexing the data into a recurring frame structure on a four-bit nibble basis. An efficient encoding scheme permits transmission of both isochronous and non-isochronous data over existing media, such as twisted pair, without degrading bandwidth previously achieved for non-isochronous data over the same media, such as using an ethernet system. Bandwidth available for a particular isochronous source/sink is selectable and sustainable with a predefined granularity. The arriving data is de-multiplexed at the hub into separate channels for handling the separate streams by appropriate hardware. Preferably, the present invention can be implemented in a fashion that is transparent to already-installed media access controllers. Preferably, some components of the system can detect the frame-transmission capability of other components and, if such capability is lacking, can fall back to a mode compliant with existing capabilities.

141 Claims, 28 Drawing Sheets

U.S. PATENT DOCUMENTS 3,988,716 A 10/1976 Fletcher et al. ..... 370/100.1
4,063,220 A 12/1977 Metcalfe ..... 340/147
4,099,024 A 7/1978 Boggs ..... 178/71
4,150,404 A 4/1979 Tercic et al. ..... 380/22
4,220,816 A 9/1980 Howells et al. ..... 370/24
4,258,434 A 3/1981 Glowinski et al. ..... 370/60
4,347,527 A 8/1982 Lainez ..... 358/310
4,359,770 A 11/1982 Suzuka ..... 370/105.3
4,412,324 A 10/1983 Glowinsky et al. ..... 370/58.1
4,419,765 A 12/1983 Wycoff et al. ..... 455/38.3
4,429,405 A 1/1984 Bux et al. ..... 375/89
4,445,213 A 4/1984 Baugh et al. ..... 370/94.1
4,449,248 A 5/1984 Leslie et al. ..... 455/38.3
4,472,802 A 9/1984 Pin et al. ..... 370/108
4,484,218 A 11/1984 Boland et al. ..... 358/86
4,530,088 A 7/1985 Hamstra et al. ..... 370/110.1
4,543,652 A 9/1985 Amada et al. ..... 370/66
4,547,880 A 10/1985 De Vita et al. ..... 370/67
4,549,292 A 10/1985 Isaman et al. ..... 370/85.15
4,556,970 A 12/1985 Flanagin et al. ..... 370/60
4,577,312 A 3/1986 Nash ..... 370/84
4,577,315 A 3/1986 Otsuka ..... 455/38.3
4,580,276 A 4/1986 Andruzzi, Jr. et al. ..... 375/269
4,587,650 A 5/1986 Bell ..... 340/825.05
4,637,014 A 1/1987 Bell et al. ..... 340/825.05
4,656,592 A 4/1987 Spaanenburg et al. ..... 364/490
4,661,902 A 4/1987 Hochsprung ..... 364/200
4,674,082 A 6/1987 Flanagin et al. ..... 370/60
4,677,611 A 6/1987 Yanosy, Jr. et al. ..... 370/85
4,689,786 A 8/1987 Sidhu ..... 370/94
4,700,349 A 10/1987 Gallager ..... 371/30
4,713,817 A 12/1987 Wei ..... 371/43
4,715,002 A 12/1987 Vernon et al. ..... 364/422
4,726,018 A 2/1988 Bux et al. ..... 370/85.5
4,759,010 A 7/1988 Murata et al. ..... 370/66
4,766,590 A 8/1988 Hamada et al. ..... 370/56
4,766,591 A 8/1988 Huang ..... 370/60
4,769,813 A 9/1988 Lenart ..... 370/60
4,771,417 A 9/1988 Maxwell et al. ..... 370/296
4,771,426 A 9/1988 Rattlingourd et al. ..... 375/120
4,782,485 A 11/1988 Gollub ..... 370/118
4,800,560 A 1/1989 Aoki et al. ..... 370/108
4,807,224 A 2/1989 Naron et al. ..... 370/94.1
4,811,367 A 3/1989 Tajika ..... 370/108
4,825,435 A 4/1989 Admundsen et al. ..... 370/85.1
4,837,799 A 6/1989 Prohs et al. ..... 379/224
4,845,609 A 7/1989 Lighthart et al. ..... 395/275
4,847,613 A * 7/1989 Sakurai et al. ..... 340/825.21
4,858,232 A 8/1989 Diaz et al. ..... 370/85.7
4,866,704 A 9/1989 Bergman ..... 370/85.4
4,872,157 A 10/1989 Hemmady et al. ..... 370/60
4,876,683 A 10/1989 Suzuki ..... 370/97
4,884,266 A 11/1989 Pflaumer ..... 370/84
4,897,831 A 1/1990 Negi et al. ..... 370/296
4,907,260 A 3/1990 Prohs et al. ..... 379/224
4,910,794 A 3/1990 Mahany ..... 455/67
4,920,483 A 4/1990 Pogue et al. ..... 395/425
4,930,127 A 5/1990 Abaziou et al. ..... 370/110.4
4,931,250 A 6/1990 Greszczuk ..... 375/8
4,954,988 A 9/1990 Robb ..... 365/189.02
4,959,774 A 9/1990 Davis ..... 364/200
4,961,188 A 10/1990 Lau ..... 370/94.2
4,964,121 A 10/1990 Moore ..... 370/100.1
4,975,830 A 12/1990 Gerpheide ..... 364/200
4,977,582 A 12/1990 Nichols et al. ..... 375/118
4,985,891 A 1/1991 Fujiwara et al. ..... 370/110.1
4,993,026 A 2/1991 Yamashita ..... 370/100.1
5,001,707 A 3/1991 Kositpaiboon et al. .... 370/94.1
5,007,045 A 4/1991 Tsuzuki ..... 370/94.1
5,014,247 A 5/1991 Albachten, III et al. ..... 365/230.05
5,018,136 A 5/1991 Gollub ..... 370/60.1
5,020,058 A 5/1991 Holden et al. ..... 370/109
5,020,132 A 5/1991 Nazarenko et al. ..... 455/17
5,041,924 A 8/1991 Blackborow et al. ..... 360/69
5,058,110 A 10/1991 Beach et al. ..... 370/85.6
5,065,398 A 11/1991 Takashima ..... 370/94.1
5,067,149 A 11/1991 Schneid et al. ..... 379/224
5,070,536 A 12/1991 Mahany ..... 455/67
5,084,872 A 1/1992 Le Cucq et al. ..... 370/85.1
5,095,494 A 3/1992 Takahashi et al. ..... 375/10
5,103,446 A 4/1992 Fischer ..... 370/85.1
5,119,373 A * 6/1992 Fredricsson et al. ..... 370/85.15
5,121,382 A 6/1992 Yang et al. ..... 370/296
5,128,930 A 7/1992 Nazarenko et al. ..... 370/60
5,134,611 A 7/1992 Steinka et al. ..... 370/79
5,138,440 A 8/1992 Radice ..... 370/110.1
5,140,587 A 8/1992 Mueller et al. ..... 370/85.15
5,146,455 A 9/1992 Goke et al. ..... 370/66
5,163,148 A 11/1992 Walls ..... 395/600
5,164,938 A 11/1992 Jurkevich et al. ..... 370/60
5,179,554 A 1/1993 Lomicka et al. ..... 370/85.13
5,189,414 A 2/1993 Tawara ..... 340/825.5
5,197,061 A 3/1993 Halbert-Lassalle ..... 370/11
5,200,952 A 4/1993 Bernstein et al. ..... 370/79
5,202,899 A 4/1993 Walsh ..... 375/8
5,206,863 A 4/1993 Nazarenko et al. ..... 371/37.1
5,208,807 A 5/1993 Gass et al. ..... 370/60.1
5,212,724 A 5/1993 Nazarenko et al. ..... 371/37.1
5,214,648 A * 5/1993 Lespagnol et al. ..... 370/85.15
5,229,998 A 7/1993 Weisser ..... 370/108
5,231,634 A 7/1993 Giles ..... 370/95
5,251,207 A 10/1993 Abensour et al. ..... 370/60.1
5,276,680 A 1/1994 Messenger ..... 370/85
5,280,500 A 1/1994 Mazzola ..... 375/17
5,283,786 A 2/1994 Hoff et al. ..... 379/85.13
5,305,306 A 4/1994 Spinney et al. ..... 370/296
5,305,317 A 4/1994 Szczepanek ..... 370/85.5
5,311,114 A 5/1994 Sambarnurthy et al. .... 370/296
5,315,588 A 5/1994 Kajiwara et al. ..... 370/60.1
5,361,261 A 11/1994 Edem et al. ..... 370/85.3
5,375,121 A 12/1994 Nishino et al. ..... 370/94.2
5,410,535 A 4/1995 Yang et al. ..... 370/13
5,422,887 A 6/1995 Diepstraten ..... 370/58.3
5,453,984 A 9/1995 Mueller ..... 370/85.13
5,487,069 A 1/1996 O'Sullivan ..... 370/94.3
5,504,738 A 4/1996 Sambamurthy et al. ..... 370/296
5,533,018 A 7/1996 DeJager et al. ..... 370/60.1
5,594,734 A 1/1997 Worsley et al. ..... 370/395
5,648,956 A 7/1997 Sambamurthy et al. ..... 370/296
5,751,724 A * 5/1998 Elliott ..... 370/366
5,761,292 A 6/1998 Wagner et al. ..... 379/93.09
5,790,786 A * 8/1998 Wakeman et al. ..... 370/366
5,946,307 A * 8/1999 Ohkuwa ..... 370/366
6,108,405 A 8/2000 Luong ..... 379/93.09

OTHER PUBLICATIONS

"ATM Overview," National Semiconductor Corp., ATM Overview F–Fred Device, Aug. 1993, entire booklet.
"ATM User–Network Interface Specification: Version 3.0," Technical Committee of the ATM Forum, pp. iii–103.
"DP839XX Isochronous Time Slot Exchanger (IsoTSX™)," Revision 0.8, bearing the date Oct. 29, 1992 and DP839XX Isochronous Ethernet Physical Layer isoPHY™ Revision 1.1, bearing the date Oct. 1992, were disclosed to IBM.
DP839XX Isochronous Ethernet Physical Layer Iso–PHY™, Revision 2.1, bearing the date Dec. 1992 and DP839XX Isochronous Time Slot Exchanger, Revision 1.0, bearing the date Dec. 13, 1992, were disclosed to IBM and Ericsson.

DP839XX Isochronous Ethernet Physical Layer Iso–PHY™, Revision 3.0, bearing the date Dec. 1992 and Isochronous Time Slot Exchanger (IsoTSX™ Workbook, Revision 1.2, bearing the date Feb. 16, 1993, was disclosed to Luxcom, Inc. of Fremont, California.

"DP8390 Network Interface Controller: An Introductory Guide", Local Area Network Databook, National Semiconductor Corp., pp. 1–206 to 1–213, 1992 Edition.

"DP83950A Repeater Interface Controller," Local Area Network Databook, National Semiconductor Corp., pp. 3–3 to 3–73, 1992 Edition.

DP83950EB at IEEE 802.3, Multi–Port Repeater Evaluation Kit, Local Area Network Databook, National Semiconductor Corp., pp. 75–87, 1992 Edition.

"DP83932B Systems–Oriented Network Interface Controller", Local Area Network Databook, National Semiconductor Corp., pp. 1–288 to 1–383, 1992 Edition.

"Exchangeable Card Architecture Specification," Release 1.00, bearing the date Dec. 20, 1991, pp. 7, 20 and 22.

"Fiber Distributed Data Interface (FDDI)—Token Ring Media Access Control (MAC)," American National Standard for Information System—Document ANSI X3.139. 1987.

Gallagher, C.A., "IEEE 802.9: A Mutli–Service Lan interface," Second IEEE National Conference on Telecommunications, Apr. 1989, York GB, pp. 173–178.

HMUX ERS "FDDI–II Hybrid Multiplexor (HMUX), " Rev. 2.4, Mar. 25, 1991.

IBM—On or about Nov. 1, 1991, IBM Corporation provided a "Task Order and appendix". A copy of pp. 6 and 7 of the Task order and appendix titled, Isoethernet Project Local Cluster Controller Version 1.2.

"IBM's Multimedia Venture: Opportunity for its Hardware?," vol. 38, No. 1930, p. 1, Sep. 21, 1992.

"IEEE 802.3, Draft Supplement to IEEE Std 802.3 DSMA/CD Access Method and Physical Layer Specifications," Institute of Electrical and Electronics, Nov. 15, 1989.

"IEEE 802.9, Draft Standard Integrated Services (IS) LAN Interface at the MAC and PHY Layers," Institute of Electrical and Electronics, Nov. 1992.

"Integrated PBX Systems, An NCC State of the Art Report," The National Computer Centre Limited, 1987.

Irube et al., "Integrated Information and Communication System for Business Networks," Hitachi Review 40(3):241–247, 1991.

"ISDN Basic Rate Interface System Design Guide," Telenetworks document, Aug. 1989.

"ISDN Primary Rate Interface System Design Guide," Telenetworks document, Jul. 1989.

"IsoEnet Transforms LANs and WANS Into Interactive Multimedia Tools" Brian Edem et al., Computer Technology Review, Winter 1992, 3 pgs. "ISO/IEC 3309" International Standard, ref. No. ISO/IEC 3309; 1991 (E), 1991, 7 pgs.

"Local Area Network Databook" published by National Semiconductor, pp. 1–3 to 1–9, 1–242 to 1–248, 5–3 to 5–7.

Martini et al., "Real–Time Traffic in FDDI–II, Packet Switching vs. Circuit Switching," IEEE Infocom 1991, vol. 3, Apr. 1991, Bal Harbour, U.S., pp. 1413–1420.

"National Proposes Isochronous Ethernet," *Electronic News,* vol. 38, No. 1940, p. 19, Nov. 30, 1992.

"PCMCIA Socket Services Inferface Specification," Draft 2.00b, bearing the date Jul. 17, 1992.

Ross, F.E. et al., FDDI—A Lan Among Mans, Computer Communications Review, vol. 20, No. 3, Jul. 1990, New York, U.S., pp. 16–31.

Shimizu, H. et al., "IVDLAN Standardization and Development," IEICE Transactions, vol. E74, No. 9, Sep. 1991, Tokyo, JP, pp. 2696–2702.

"Token–Ring Network Architecture Reference," pp. 5–1 through 5–28 and pp. 5–10 and 5–17.

"VersaNet™ An Ethernet Extension for Isochronous Communications," bearing the date Aug. 14, 1992 is a paper sent to National Semiconductor Corp. from Condor Systems, Inc. of San Jose, CA on Aug. 18, 1992.

Wirbel, Loring, "Scheme for Fast Ethernet Proposed," appears to be a newspaper article; date of article is uncertain, but is believed to be prior to Mar. 1993.

Wong, David., "Second Generation 10Base T Silicon Solutions," IRE Wescon Convention Record, vol. 35, Nov. 1991, No. Hollywood, Ca. pp. 238–242.

* cited by examiner

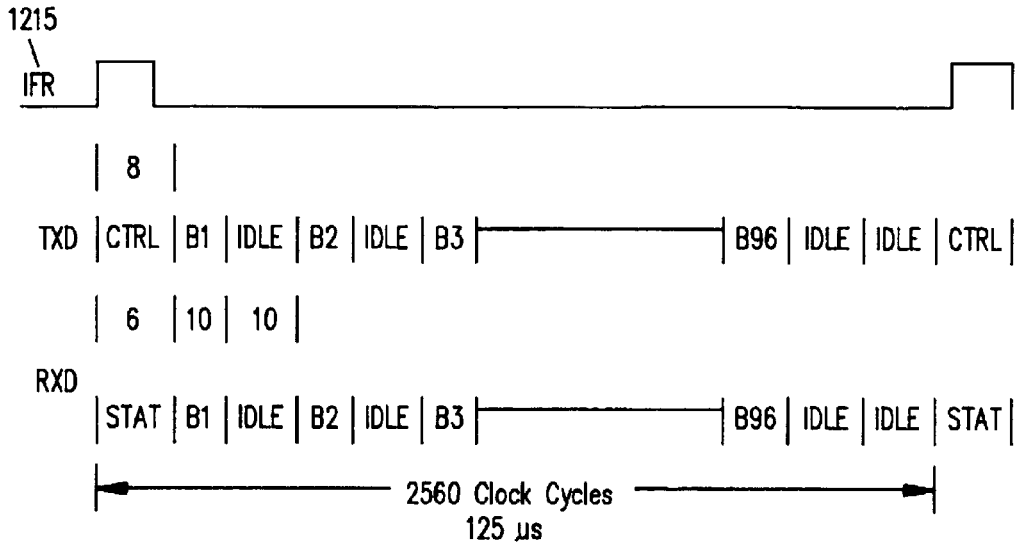

TXD: Data sent from Isochronous Data Exchanger to Physical Layer Portion.
RXD: Data Received by Isochronous Data Exchanger from Physical Layer Portion.
IFR: Isochronous Frame Sync signal sent from Isochronous Data Exchanger to Physical Layer Portion.
CTRL: Control data sent from Isochronous Data Exchanger to Physical Layer Portion.
STAT: Status data sent from Physical Layer Portion to Isochronous Data Exchanger.
B(1:96): B channel data (96 bytes of Bchannel data per µs cycle).
IDLE: Filler data.

FIG. 15A

FIG. 15B

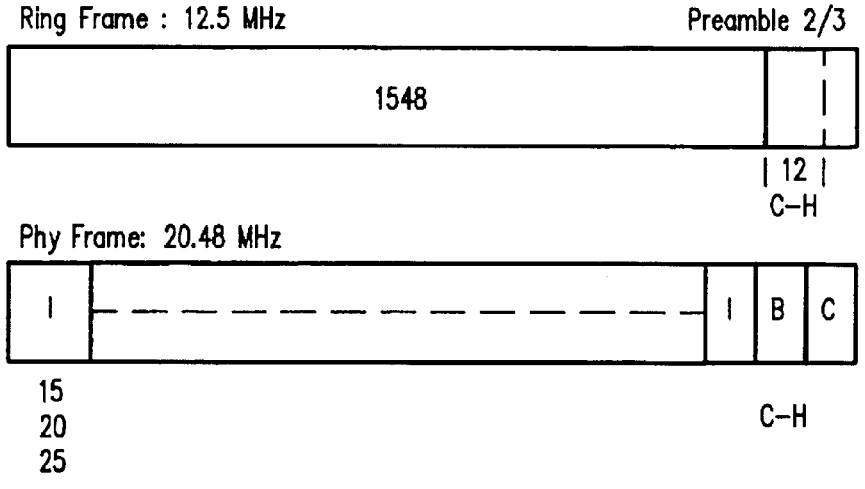

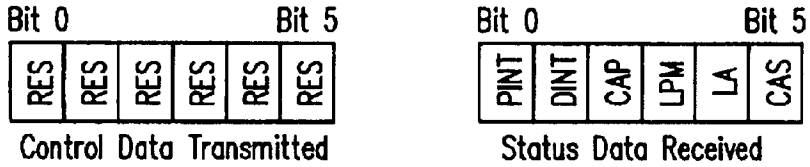

Control Bits

RES: Reserved bit.

Status Bits

CAS: Cascade bit: Used to activate the port 1 cascade logic.

LA: Link Active: Indicates that the link is isochoronous active when set.

LPM: Low Power Mode: Indicates that the isophy is in low power mode when set.

CAP: CAPacity: Indicates the type of Isochronous capacity.
"1" 15.872 Mbps Isochronous bandwidth
"0" 6.144 Mbps Isochronous bandwidth DIN T: D INTerrupt: Indicates that the isophy has received a start of D channel packet when set.

PIN T: M INTerrupt: Indicates that the isophy's maintenance has changed when set.

FIG. 18

Receive Switch Table

| Switch Table Address | | Parity | TSE | ITE | ETE | Data Buffer Address |
|---|---|---|---|---|---|---|
| Isochronous Maintenance Channel (IMC) | 0 | | | | | |
| TSI Ring A Slot 1 | 1 | | | | | |
| TSI Ring A Slot 2 | 2 | | | | | |
| ⋮ | ⋮ | | | | | ⋮ |
| TSI Ring A Slot 1535 | 1535 | | | | | |
| TSI Ring A Slot 1536 | 1536 | | | | | |

MSB LSB
1 Bit 1 Bit 1 Bit 1 Bit ← 11 Bits →

FIG. 24A

Transmit Switch Table

| Switch Table Address | | Parity | Not Used | IPE | IA | Data Buffer Address |
|---|---|---|---|---|---|---|
| Not Used | 0 | | | | | |
| Port 1, B channel 1 | 1 | | | | | |
| Port 2, B channel 1 | 2 | | | | | |
| ⋮ | ⋮ | | | | | ⋮ |
| Port 14, B channel 96 | 1535 | | | | | |
| Port 2, B channel 96 | 1536 | | | | | |

MSB LSB
1 Bit 1 Bit 1 Bit 1 Bit ← 11 Bits →

FIG. 24B

Bit Definitions

IA: Idle Address: Indicates the idle pattern to be sent.

ITE: Internal Transmit Enable: Indicates on internal loopback of the slot when set.

IPE: Idle Pattern Enable: Indicates the use of a quiet pattern when set.

| Switch Table Address | | Receive Switch Table | | | | |
|---|---|---|---|---|---|---|
| Isochronous Maintenance Channel (IMC) | 0 | Parity | TSE | ITE | ETE | Data Buffer Address |
| TSI Ring A Slot 1 | 1 | | | | | |
| TSI Ring A Slot 2 | 2 | | | | | |
| ⋮ | ⋮ | | | | | ⋮ |
| TSI Ring A Slot 1535 | 1535 | | | | | |
| TSI Ring A Slot 1536 | 1536 | | | | | |
| | | MSB | | | | LSB |
| | | 1 Bit | 1 Bit | 1 Bit | 1 Bit | ← 11 Bits → |

FIG. 25A

| Switch Table Address | | Transmit Switch Table | | | | |
|---|---|---|---|---|---|---|
| Isochronous Maintenance Channel (IMC) | 0 | Parity | TSE | Not Used | ETE | Data Buffer Address |
| TSI Ring B Slot 1 | 1 | | | | | |
| TSI Ring B Slot 2 | 2 | | | | | |
| ⋮ | ⋮ | | | | | ⋮ |
| TSI Ring B Slot 1535 | 1535 | | | | | |
| TSI Ring B Slot 1536 | 1536 | | | | | |
| | | MSB | | | | LSB |
| | | 1 Bit | 1 Bit | 1 Bit | 1 Bit | ← 11 Bits → |

FIG. 25B

Bit Definitions

ETE: External Transmit Enable: In Mode 2, indicates an External switching of slot when set.

TSE: Tri-State Enable: The isoTSX drives the TSI ring output drivers when set.

DATA COMMUNICATION NETWORK WITH TRANSFER PORT, CASCADE PORT AND/OR FRAME SYNCHRONIZING SIGNAL

Matter enclosed in heavy brackets [ ] appears in the original patent but forms no part of this reissue specification; matter printed in italics indicates the additions made by reissue.

This is a continuation-in-part of Ser. No. 07/969,916, filed Nov. 2, 1992 abandoned, for "Network Data Communication With Isochronous Capability", incorporated herein by reference.

The present invention relates to communication between stations or between two high bandwidth buses in a data communication system, such as a local area network or wide area network, and in particular to a network for transferring isochronous data with a transfer port, a hub cascade port and/or a frame synchronizing signal.

BACKGROUND OF THE INVENTION

In general terms, isochronous data is data which is non-packetized and of indeterminate, potentially continuous duration. Increasing availability of multi-media computers and work stations has contributed to an increase in interest in the transfer of data from isochronous data sources and sinks. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but "bursty" in nature. An example of packetized data transfer is the commonly-used ethernet system. Standard ethernet systems are described in IEEE Standard 802.3. One implementation of which, known as 10 Base T, is described in the draft nine supplement to IEEE standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring network is described in IEEE standard 802.5.

In contrast, FIG. 1C schematically depicts isochronous data transfer. In isochronous data transfer, the data transfer or connection is initiated, such as by initiating a telephone conversation or beginning a video camera transmission 30. After the connection is initiated, transmission of the data, possibly accompanied by transmission of housekeeping information (such as destinations, audio or video timing, and the like) is provided substantially continuously for an indeterminate period, such as until termination of the connection 32. Although it may be that not every bit transferred represents a data bit (since "housekeeping" bits may also be transferred), the transfer of data is substantially continuous in the sense that there are no substantial periods during which no data bits are transferred. It is possible that the data being transferred is "Null" data such as silence during a telephone conversation or transfer of a blank video image. One type of isochronous data transfer is the Fiber Distributed Data Interface-II (FDDI-II) as described, for example, in FDDI-II Hybrid Multiplexer, Revision 2.4, dated Mar. 25, 1991.

Previous attempts to accommodate isochronous data on a data network have resulted in characteristics which are disadvantageous for at least some applications. In some previous isochronous devices, the bandwidth available for accommodating a given isochronous source or sink was at least partially dependent on the demand on the network (i.e. on the total amount of data from and to sources and sinks transmitting and receiving on the network). In this type of system, performance of an isochronous source or sink could perceptibly degrade as additional sources or sinks were added to the network, such as by increasing data transfer delay. Previous devices have not been configured to require an interface between isochronous data storage or switching device internal data buffers and an isochronous physical layer. Accordingly, it would be advantageous to provide an isochronous communication system which encapsulates the datapath between isochronous data storage or switching device internal data buffers and the isochronous physical layer. Previous devices typically used a backbone network in order to connect one hub to another. It would be advantageous to provide for one isochronous-based hub to be cascaded to another in a system without using a backbone network. It would also be advantageous to provide a synchronization signal for synchronizing transmissions between isochronous data storage or switching device internal data buffers and the isochronous physical layer.

SUMMARY OF THE INVENTION

The present invention provides for communication of data to and from isochronous data sources and sinks. Of the total bandwidth used for communication over the network links or physical media, at least a portion of the total bandwidth is dedicated to isochronous traffic. Preferably, a portion of bandwidth on the link is also dedicated to convey data to and from non-isochronous sources and sinks, as well as to permit conveying housekeeping information (such as information relating to data sources and destinations and status and control maintenance information).

In one embodiment, data from an isochronous data source is time-division multiplexed with the data output from a non-isochronous source such as the data output from the media access controller from a previously available non-isochronous network node. These two data streams are preferably also multiplexed with maintenance data (sometimes referred to as "M channel") and signaling data (sometimes referred to as "D channel" data). The various types of data are time-division-multiplexed in a repeating frame structure or template. The template is constructed to satisfy the data rate requirements of the various data sources and sinks. The data streams are encoded for transmission using an efficient coding scheme which permits non-isochronous data to be transmitted at a rate not substantially smaller than, and preferably substantially equal to the data rate at which the non-isochronous data was transmitted according to previously available network systems.

Preferably, the present system is implemented as a star-topology network with data sources transmitting to a central hub which, in turn, transmits the data to data sinks. Although, for convenience, much of the following discussion is in terms of hubs and nodes, aspects of the present invention can be implemented in topologies other than hub-and-node topologies (e.g., ring topologies, and tree topologies), as will be apparent to those of skill in the art. Descriptions of hub circuitry in the following can be implemented, e.g., on a PBX adapter card for a personal computer. Several star-topology systems can be connected by providing inter-connection of the hubs, for example, in a ring structure (FIG. 3A). The system could also be arranged in a tree structure where one hub 44d is connected to others (44c, 44f) as depicted, e.g., in FIG. 3B. The multiplexed data from the node which arrives at the hub is de-multiplexed to separate the isochronous-source data, the non-isochronous-source data and the D channel and M channel information. The non-isochronous-source data can be provided to hub circuitry specialized for handling the non-isochronous data stream.

The separated isochronous data is conveyed to hub circuitry specialized in handling the data stream, where it can be transmitted to the destinations within the network. In one embodiment, the separated isochronous data is placed on a high bandwidth hub bus, with bandwidth capable of transmitting the collective isochronous data streams arriving from all nodes connected to the hub. The data arriving from the nodes can be placed onto the high bandwidth bus (e.g., a time slot interchange or "TSI" ring) by a time slot exchanging function. One type of time slot interchange is described in FDDI-II Hybrid Multiplexer, Revision 2.4, dated Mar. 25, 1991. Preferably, the isochronous data is placed onto the high bandwidth bus and retrieved from the high bandwidth bus (for transmission back to the destinations) according to switching tables programmed in accordance with source/destination data transmitted over the signalling D channel. In this way, the hub has sufficient intelligence to establish and maintain isochronous communication sessions or connections which may be requested on the D channel.

The hub contains multiplexers for combining both isochronous-sourced data such as that retrieved from the isochronous circuitry and non-isochronous-sourced data e.g. from ethernet hub repeater circuitry. These data sources, along with M channel and D channel information, are multiplexed in a fashion similar to the multiplexing which occurred at the nodes and the multiplexed data is transmitted back to the nodes, preferably over a separate set of one-way twisted pair media. The nodes contain demultiplexers, similar to those found in the hub, for separating the isochronous-sourced data, non-isochronous-sourced data, D channel and M channel information streams. The separated non-isochronous data is preferably converted to a form compatible with previously available media access controllers, such as the media access controllers which sourced the non-isochronous data. The isochronous data may be provided to isochronous data sinks connected to the node.

A transfer port is provided to encapsulate the datapath between the isochronous data exchanging circuit internal data buffers and the isochronous physical layer. The transfer port contains buffering, parallel to serial, serial to parallel conversion (based on direction) and timing control. The transfer port maps the data frame to the internal data buffers, operating at a different clock rate, by doing all the required adjustments. It receives port data serially, groups and writes the data into the internal data buffers so that they can be switched into the ring, e.g. as a ten-bit word. In one embodiment, the 10-bit word includes 8 data bits, one parity bit and one received bit. In another embodiment, the control bit is not provided and 9-bit words are used or the control bit is reserved. While performing data loading in one word per clock cycle, a ten-bit bus can be used by 16 ports, rather than requiring a 160-bit bus.

Preferably, each hub is provided with one or more cascade ports. A cascade port allows the networking of two isochronous hubs without using a backbone network. The cascade hub is provided a first in, first out (FIFO) buffer which is deep enough to hold up to a whole frame of data and is provided in the datapath on the transmit side of the cascade hub. The cascade port capability can be provided by circuitry in the physical layer portion, as well as in the hub generally.

The specialized isochronous circuitry receives a TSI start delimiter signal from a TSI ring and, in response, generates a frame synchronization signal to the physical layer. The frame synchronization signal is used for synchronizing the data transmission between the internal data buffers and the physical layer. The frame synchronization signal is generated in a time window a specified number of clock cycles after the frame start delimiter. An adjustable delay is used to maintain the synchronization signal in the time window. The described system can also be used to handle communication between two high bandwidth buses.

BRIEF DESCRIPTION OF THE DRAWINGS

FIG. 15A is a timing diagram of a transmit word and a receive word according to one embodiment of the present invention;

FIG. 15B is a block diagram of a ring frame and physical layer portion frame;

FIG. 18 is a block diagram depicting control data and status data bit positions;

FIG. 24A is a schematic diagram of a received switch table according to an embodiment of the present invention;

FIG. 24B is a diagram of a transmit switch table according to an embodiment of the present invention;

FIG. 25A is schematic depiction of received switch table according to an embodiment of the present invention;

FIG. 25B is a schematic depiction of a transmit switch table according to an embodiment of the present invention.

DETAILED DESCRIPTION OF THE PREFERRED EMBODIMENT

Figure 1A:
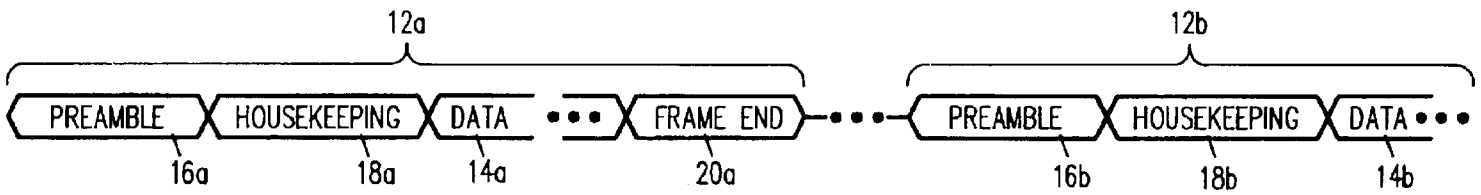
FIGS. 1A, 1B and 1C of the timing of a packet transmission system, a token ring transmission system, and an isochronous transmission system respectively.
Figure 1B:
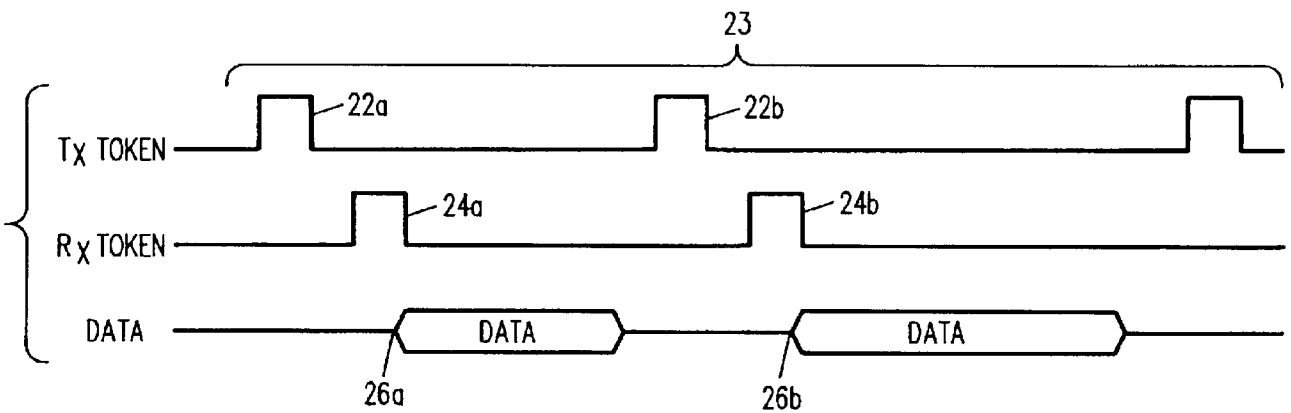
Figure 1C:
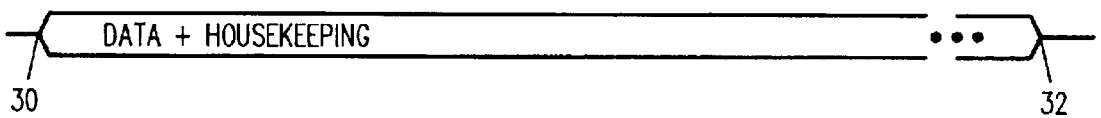

Before describing the details of the transfer port, cascade port and frame synchronization, a discussion of the general configuration of an isochronous-capable network will be provided.

A data communication system for isochronous data can be configured in a star-topology with a plurality of nodes 42a, 42b, 42c, each coupled to a hub 44a by data links comprising physical data transmission media such as one-way twisted pair wires 46a–46f. The number of nodes can be adjusted depending on the data transmission nodes and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e using transmitters 78a, 78b, 78c and receipt of signals from the physical media 46b, 46d, 46f using receivers 79a, 79b, 79c and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an ethernet media access controller 48c, 48g, and signaling or D channel sources and sinks such as an emulated or virtual key pad 48f provided, for example, on a personal computer (PC) terminal.

Each of the nodes 42a, 42b, 42c can include various types of sources and sinks such as strictly isochronous sources and sinks, such as depicted for node one 42a, strictly non-isochronous sources/sinks as depicted for node three 42c or both isochronous and non-isochronous sources and sinks as depicted for node two 42b. In one embodiment the network is able to operate properly even when connected to one or more nodes which are incapable of communicating using the time-division-multiplexed frame structure described below. For example, the hub 44a could be connected to one or more nodes which contain only previously-available circuitry such as 10 Base T. In this embodiment, the hub is able to detect whether a particular node is capable of time-division-multiplexed frame structure communication as described below. If the node does not have this capability, the hub will fall back to, e.g., a 10 Base T compliant communication mode.

In general terms, and in general accord with the International Standards Organization (ISO) network reference mode, the physical layer of the network is the circuitry between the media access controllers and the media (in the nodes) and between the repeater circuitry (if any) and the media (in any hubs). The physical layer 52 of the network system depicted in FIG. 2 has portions which include the physical media 46a–46f and physical layer devices such as the node data receivers and converters 50a, 50b, 50c, and the hub components 54a, 54b, and 54c. The physical layer can include devices for providing, e.g., transceivers for 10 Base T cables, data multiplexing, phase locked loop circuitry, FIFOs or other circuitry for cable length adjustment, smoothing, squelch and the like.

Figure 3A:
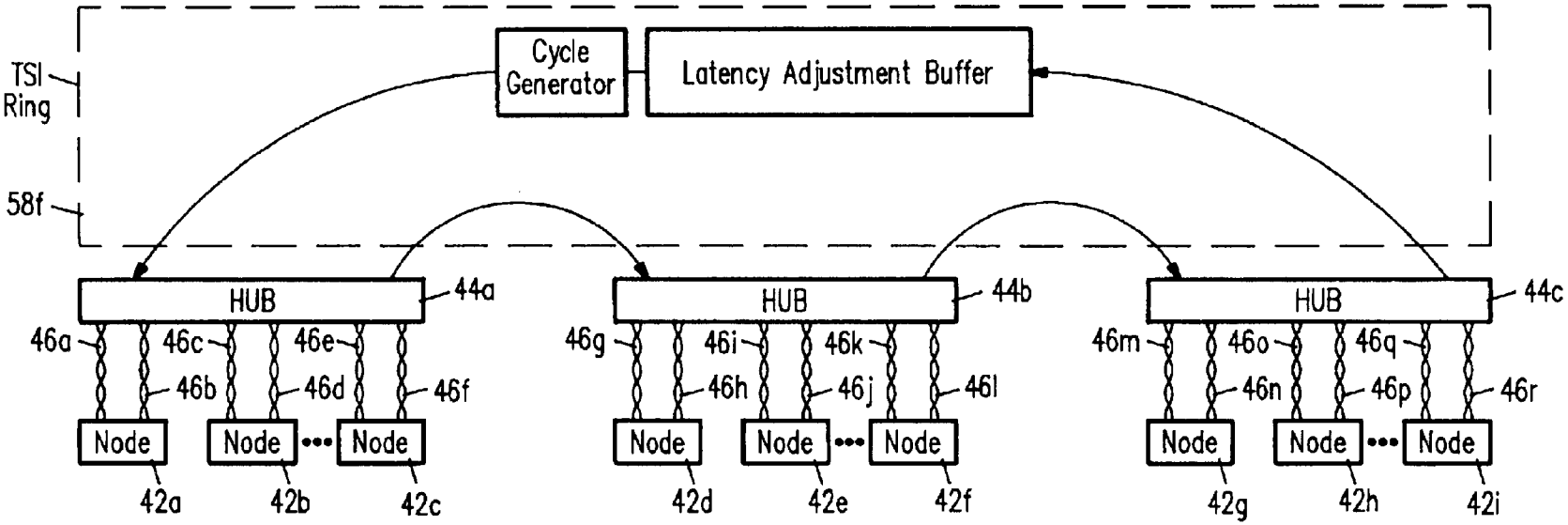
FIG. 3A is a schematic block diagram showing a number of hubs connected together using a ring structure.
Figure 3B:
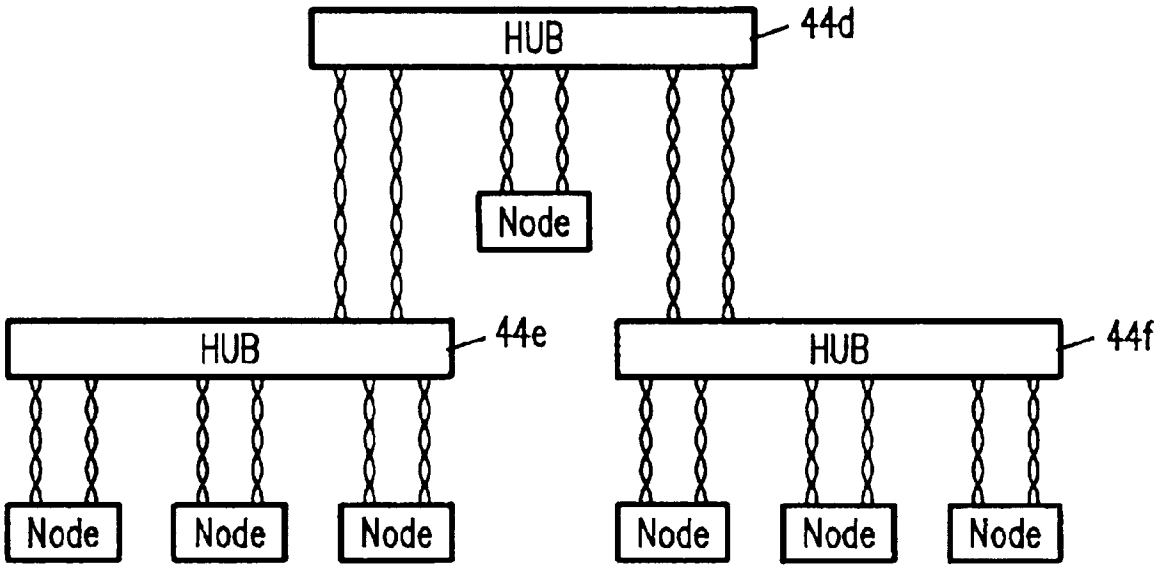
FIG. 3B is a block diagram showing a number of hubs connected together using a tree structure.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller 58 for placing the data on a high-bandwidth bus so that it can be transported to destination nodes, e.g., on other TSI controllers in the same hub or in other hubs (as depicted in FIGS. 3A and 3B) or locally looped back to one of its attached nodes and retrieved by hub circuitry 54a, 54b, 54c for transmission to one or more of the various destination nodes 42a, 42b, 42c. The separated non-isochronous data is provided to circuitry 60 configured to convey the non-isochronous data to one or more of the hub circuitry 54a, 54b, 54c for transmission to destination nodes 42a, 42b, 42c. In an embodiment in which non-isochronous-sourced data includes ethernet data, the hub circuitry 60 can be a standard ethernet repeater processor. The D channel and M channel information is provided to a signaling processor 62 which performs various maintenance and control functions such as identifying and alerting users of error conditions, and setting up requested connections, i.e. source/destination paths e.g. by communicating with the isochronous and non-isochronous controllers 58, 60, e.g. over datapath 64. The isochronous controller 58 can be a data exchanger, e.g., an isochronous switching device, such as that described in commonly-assigned application Ser. No. 08/146,337, abandoned, (attorney docket no. 8332-331) titled "Time Slot Exchanger Mechanism in a Network for Data Communication having Isochronous Capability," filed on even date herewith and incorporated herein by reference. The non-isochronous controller 60 can be, e.g., an Ethernet repeater.

A number of star-topology systems can be interconnected e.g., by connecting hubs 44a, 44b, 44c to one another in a ring structure as depicted in FIG. 3A wherein each of these hubs 44a, 44b, 44e have nodes attached in a star topology or by connecting hubs in a tree structure as depicted in FIG. 3B wherein 44d has 44c and 44f connected to it in the star topology. In the configuration depicted in FIG. 3A, the hubs 44a, 44b and 44c are connected in a ring-topology with first hub 44a sending data to the second hub 44b, the second hub 44b sending data to the third hub 44c, the third hub sending data back to the first hub 44a via a ring latency adjustment and cycle generator circuitry. Preferably the data is sent in the same form as output onto the high bandwidth hub bus by the time slot interchange controller 58 and thus the inter-hub connections are referred to as a Time Slot Interchange (TSI) ring. In one embodiment, an FDDI-II system can be used as a backbone to carry the TSI ring data to other hubs as illustrated by 58f in FIG. 3A.

A description of the operation and sub-components of the depicted embodiment of the present invention (FIG. 2) will be provided by describing the transfer of data from isochronous source 48d and non-isochronous source 48c to isochronous sink 48b and non-isochronous sink 48g.

Data sent from isochronous device 48d is a continuous stream of digitized data from e.g. a video camera. In one example, the data from isochronous device 48d will be taken as having a data rate equal to the American "T1" standard of 1.544 Mbps. Data output from the ethernet MAC 48c is provided at the standard 10 Base T ethernet rate of 10 Mb/sec. D channel information is provided from a D channel data stream source, preferably contained in a MAC or other circuitry in the system, or, for example, from the virtual key pad 48f at a variable data rate, such as a rate not exceeding about 64 Kbps. These incoming data streams are provided over lines 66a, 66b, 66c to node circuitry 50b' (FIG. 4), which is a portion of the device 50b depicted in FIG. 2. The incoming data from the various sources is provided to a multiplexer 70 which performs time-division multiplexing on a four-bit basis. The pattern for the time-division multiplexing is a repeating series of frames or templates. In this embodiment of the invention, the frames are repeated every 125 microseconds.

Table IA depicts the manner in which the various data streams, and additional data and control bytes are time-division multiplexed. Each symbol in Tables IA and IB represent four bits of data so that every group of two symbols represents one 8-bit byte of data. In Table IA, E represents four bits of data from the non-isochronous ethernet stream 66a, B designates four bits of data from the isochronous stream 66b, D represents four bits of data from the signaling or D channel stream 66c, and M represents four bits of M channel data 66d which preferably is provided by circuitry 50b'. In addition, certain byte-length patterns are provided. JK represents a frame synchronization pattern and EM (the first two bytes of block three in Table IA) represents an ethernet "pad" followed by a maintenance nibble as described below. As seen in Table IA, each frame contains 256 bytes which can be considered in thirty-two groups of eight bytes each, or four blocks of sixty-four bytes each. The frame structure is described more thoroughly in commonly-assigned application Ser. No. 07/969,911 (Attorney File No. 8332-315/NS-2024), titled "NETWORK FOR TRANSMITTING ISOCHRONOUS-SOURCE DATA WITH A FRAME STRUCTURE" filed on Nov. 2, 1992 and incorporated herein by reference.

Another frame format that can be used in connection with the present invention is shown in Table IB. The frame template of Table IB shows a frame for all-isochronous communication (as opposed to mixed isochronous-ethernet communication of Table IA). In general, Table IB is similar to Table IA, with replacement of all "E" symbols with "B" symbols. As seen in Table IB, the last one or two bytes in each block are "Idle" data bytes.

The all-isochronous capability provides 248B or 15,872 Mbps of isochronous information per frame. The all-isochronous capability is useful where non-isochronous data networking is not needed or where isochronous information bandwidth greater than 6,144 Mbps is needed. To provide this capability, a special embodiment of the transfer port is used which provides approximately three times the data rate for a single port or physical layer to the internal buffers of the specialized isochronous data exchanging circuitry.

In one embodiment, regular isochronous capability (6.144 Mbps) is intermixed with all-isochronous capability (15.8272 Mbps). When the all-isochronous capability is active, a single all-isochronous capable port assumes three regular isochronous ports. Preferably, the type port assignments, whether regular or all-isochronous can be made through programming of the transfer port.

In the example of a specialized isochronous switching circuit where port 16 will be used as the all-isochronous port, the data is mapped to port 14–16 locations in the internal data buffer. Furthermore, the timing of the port 16 data loaded into the internal data buffers is in an order achievable with minimal timing circuitry, as described more fully below.

The depicted frame structure provides an allocation of bandwidth such that the data rate for the non-isochronous data are compatible with e.g. 10 Base T ethernet data rates. Other types of frame structures could be used in connection with other isochronous and/or non-isochronous data sources and sinks such as token ring non-isochronous sources and sinks, in which case a different frame structure can be used to provide an allocation of bandwidth suited for the particular purpose.

Figure 4:
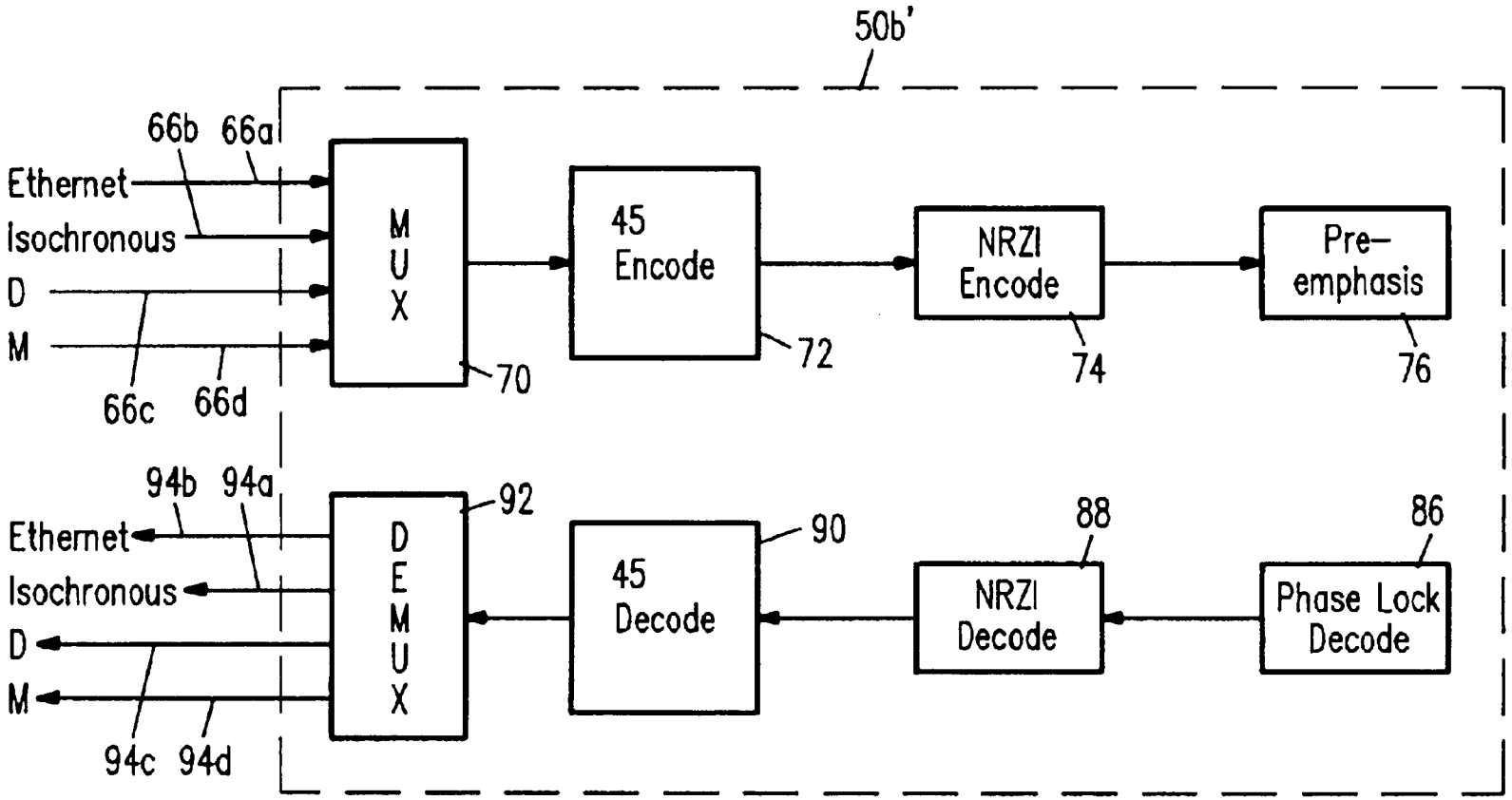
FIG. 4 is a schematic block diagram of circuitry for multiplexing and preparing data for transmission over the media and for receiving information from the media and demultiplexing the data.

As shown in FIG. 4, the time-multiplexed data is then encoded by an encoder 72. In the depicted embodiment, the encoder performs four/five encoding. One particular form of four/five encoding conforming partially to the ANSI X3T9.5 standard, is depicted in Table II. These patterns, when properly combined, have a maximum of three bit times with no transition. With a bit rate of 48.8 ns, the minimum transition rate is 3.41 Mhz or 146.5 ns between transitions.

The encoding scheme depicted in Table II is described in greater detail in commonly-assigned application Ser. No. 07/970,329 (Attorney File No. 8332-316/NS2022), titled "FRAME-BASED TRANSMISSION OF DATA", filed on Nov. 2, 1992 U.S. Pat. No. 5,361,261, and incorporated herein by reference.

A standard ethernet system uses the absence/presence of a carrier signal to indicate the start of a packet. In the present system, the frames are transmitted continuously, one after another, and there is not significant period during which there is a lack of signal on the physical media. Thus, a "no ethernet carrier" symbol (Table II) is used to denote lack of an ethernet carrier in the output from the ethernet MAC.

The results of the four/five encoding is then further encoded by encoder 74 (FIG. 4) using a non-return to zero, inverted (NRZI) scheme. The NRZI encoder modifies the bit stream by inverting the output whenever a logic 1 is transmitted. Logic 0 produces no change in state.

Comparing the standard ethernet signalling rate and data rate to that provided by the frame structure of Tables IA and IB and encoding of Table II, it is seen that in the present scheme, a frame of data contains 313 "E" symbols or 1252 E bits. By transmitting frames at a rate of one frame every 125 microseconds, the present scheme has a capacity for transmitting 10.016 Mbits/sec of ethernet-sourced data interspersed with 6144 Kbits/sec of isochronous data. Thus by using the four/five-NRZI encoding, the data rate and signaling rate is within two and one-half percent of the signaling and data rate used by 10 Base T, allowing both isochronous traffic and ethernet traffic to travel over existing physical media 46 without seriously degrading the data rate of the ethernet traffic, compared to previous standard ethernet systems. The four/five-NRZI encoding permits physical media having the same bandwidth as previous systems to accommodate both the 10 Mbits/sec ethernet data stream and a 6144 Kbit/sec isochronous stream, as well as a 64 Kbit/sec D channel, a 96 Kbit/sec maintenance channel, and 64 Kb/sec for the frame synchronization pattern. Additionally, 80 Kb/s (64 Kb/s+16Kb/s) are available but undefined. These characteristics are summarized in Table III. FIG. 15B shows the structure of a physical layer frame, in comparison with the structure of, e.g., a TSI ring frame.

In one example, it is assumed that the data rate output from the isochronous source 48d is 1.544 Mb/sec. However, the frame structure noted above provides an isochronous bandwidth capability of 6.144 Mb/sec. Thus, the single isochronous source 48b in the present example can be entirely accommodated using only 48 of the 192 "B" symbols per frame (i.e. 24 bytes per frame or 192 bits per frame). This leaves 72 "B" symbols per frame unutilized by source 48d. It is possible to use the present invention to transfer data from a single isochronous source outputting at a rate of 6.144 Mb/s or the isochronous bandwidth available may be allocated with a granularity of 64 Kb/s, i.e. it may be split into multiples of 64 Kb/s.

The output from the NRZI encoding devices is sent to pre-emphasis circuitry 76. The pre-emphasis circuitry compensates the signal transmitted onto the physical medium to reduce the jitter. The data output by the pre-emphasis circuitry 76 is sent to a transmitter or driver 78b and the signal is transmitted over the physical medium 46c. The physical medium 46c can be any of a number of media types including twisted pair, coaxial or fiber optic cable.

Figure 5:
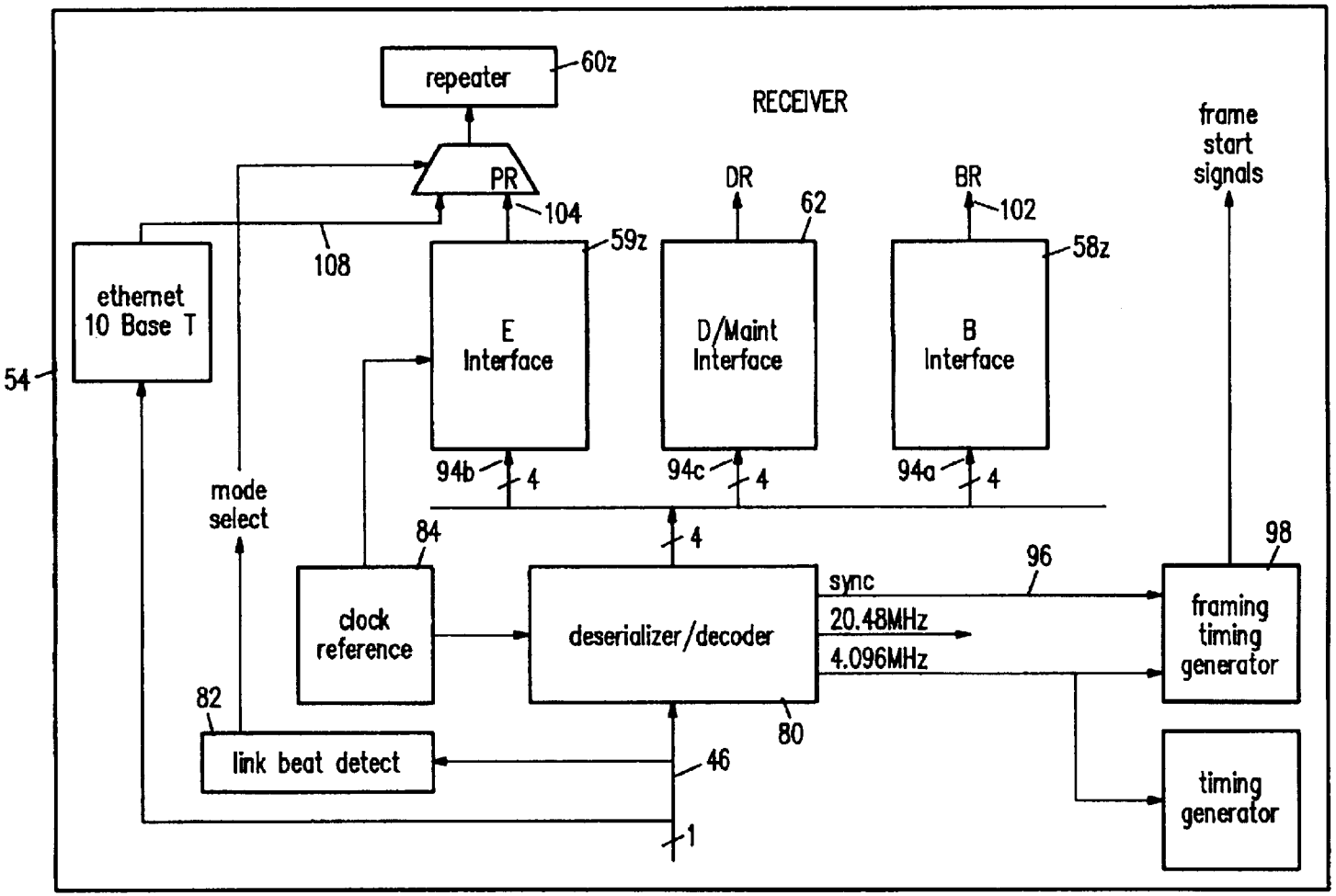
FIG. 5 is a schematic block diagram of receiver circuitry according to an embodiment of the present invention.

The data sent over the physical media 46a is received in the hub 44a. The hub contains a plurality of circuit devices 54a, 54b, 54c, each one coupled to one of the nodes 42a, 42b, 42c by the physical media 46a–46f. As depicted in FIG. 5, the data transmitted over the physical media 46 arrives serially at a de-serializer/decoder 80. Link detect circuitry 82 also receives the data from the physical media 46 for detection of the mode in which the node is operating (e.g. 10 Base T, isochronous-ethernet or isochronous) and outputting a mode select signal. The de-serializer/decoder 80 receives a reference clock signal 84. The de-serializer/decoder includes circuitry which is functionally an inverse of the multiplexing/encoding circuitry described above. Referring to FIG. 4, the de-serializer/decoder includes phase lock decode circuitry 86, the results of which are provided to NRZI decode circuitry 88 which, in turn, provides the decode results to four/five decode circuitry 90, in turn providing results to a de-multiplexer 92 which separates the received data into the isochronous-sourced data 94a the non-isochronous-sourced data 94b and signaling data, such as D channel 94c and M channel data 94d. The de-serializer/decoder 80 also outputs a synchronization signal, derived from the JK frame synchronization symbols 96 for use by a framing timing generator 98.

Both the non-isochronous-sourced data 104 and the isochronous-sourced data 102 are made available to hub circuitry 56 or components 54a, 54b, 54c, as needed for transmission back to destination nodes.

Figure 6:
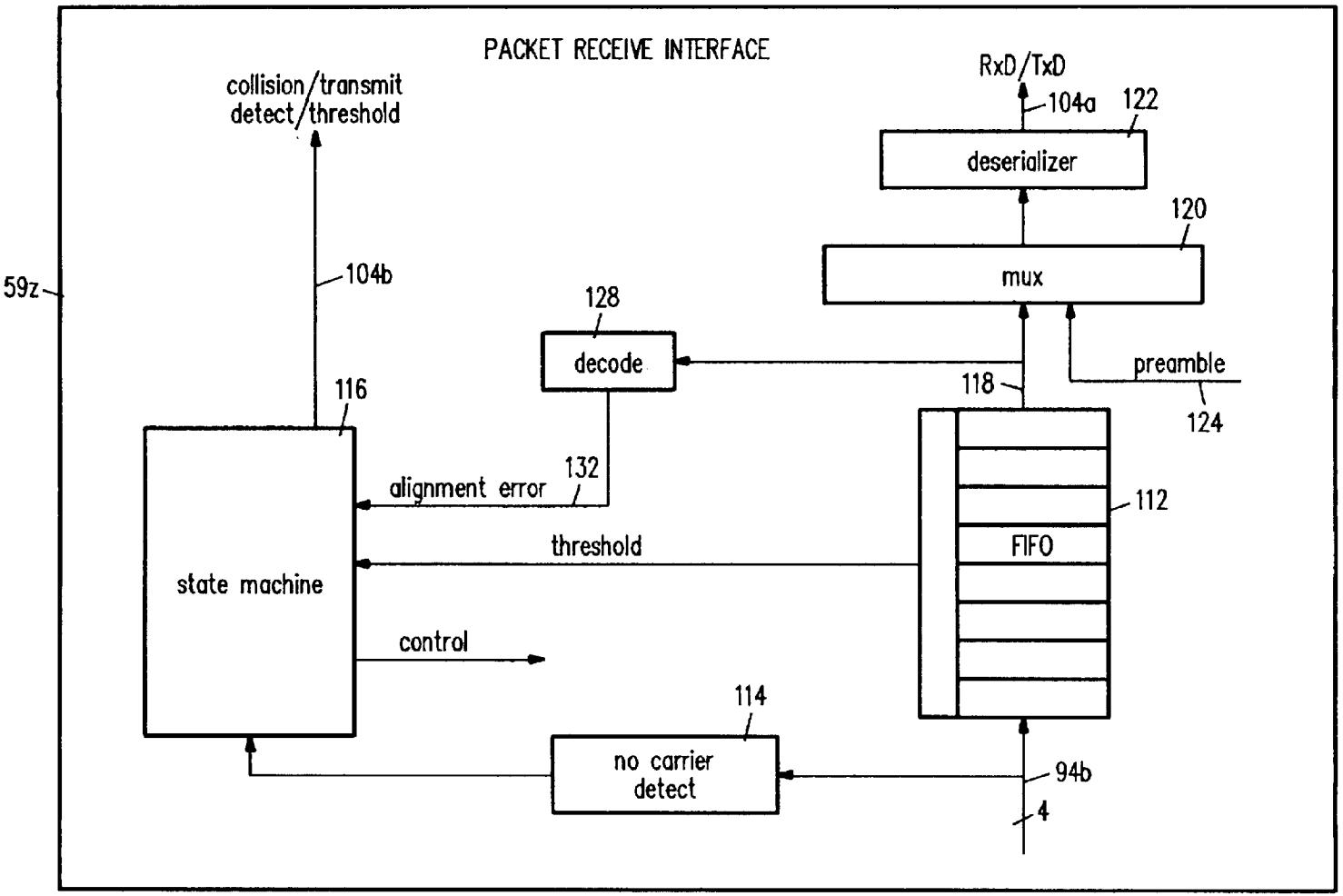
FIG. 6 is a block diagram depicting the packet receive interface, according to an embodiment of the present invention.

FIG. 6 depicts one implementation of an E interface 59z of a type which will receive the non-isochronous data 94b and provide outputs 104a, 104b of a type that can be processed by previously-available repeater circuitry 60. The non-isochronous data is received in a first-in-first-out (FIFO) buffer 112 to smooth out data rates. Circuitry 114 detects "no carrier" symbols, provided to emulate ethernet data packets, which will be used by logic circuitry or state machine 116 to output carrier detect signals. The outputs 118 from the FIFO 112 is provided to a multiplexer 120 and a de-serializer 122 to produce data output 104a. The multiplexer 120 can receive a preamble stream 124 to provide the proper preamble bits in the output data 104a. Output 118 from the FIFO 112 is also provided to decode circuitry 128 to recognize alignment error symbols and output appropriate signals 132 to state machine 116.

For purposes of example, it will be assumed that data from isochronous-source 48d is transmitted in the first 24 bytes of each frame represented by the "B" symbols in block 0 of Tables IA or IB (i.e. the first forty-eight "B" symbols in the frame structure).

Figure 7:
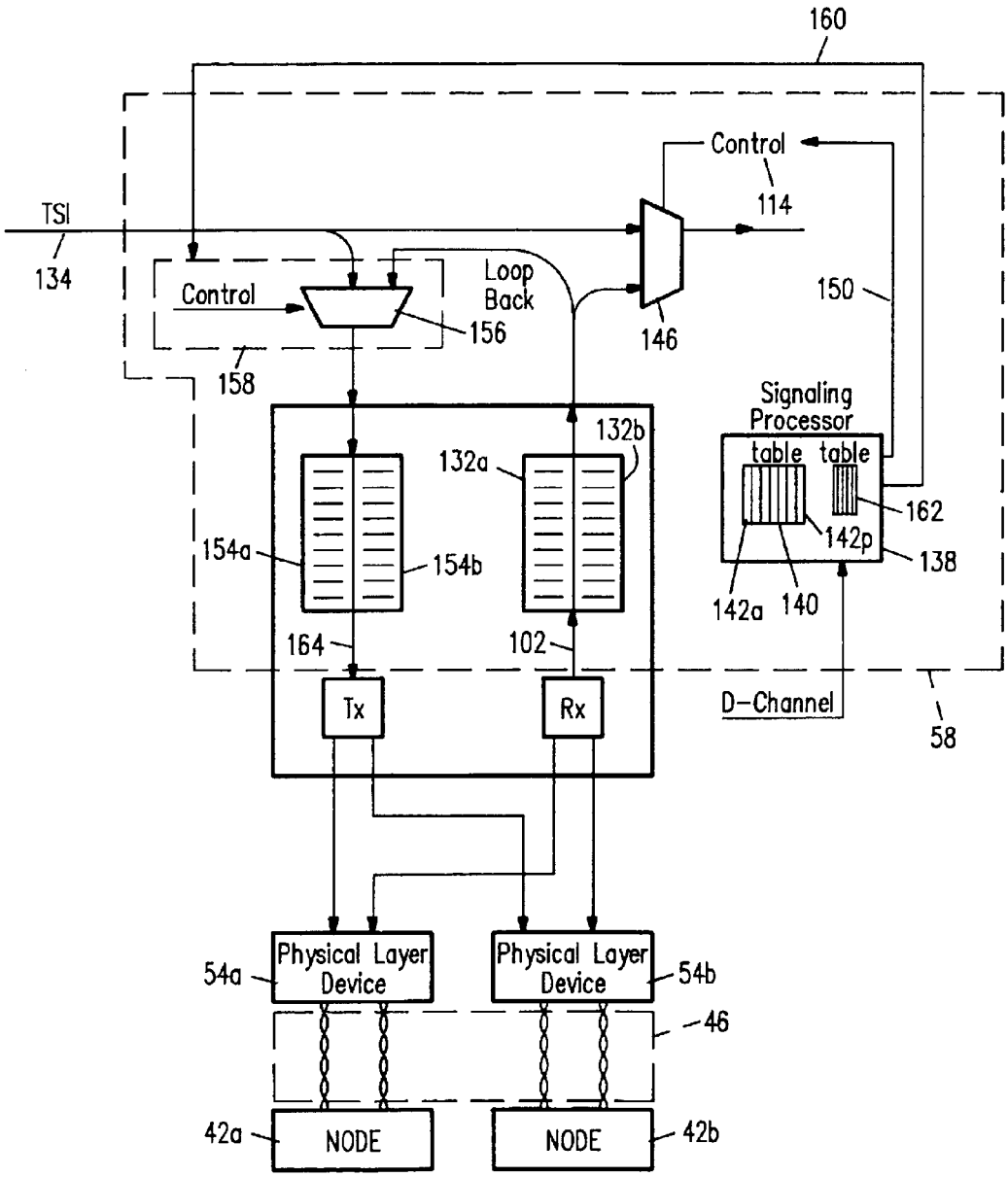
FIG. 7 is a schematic block diagram of a signaling processor in the hub and its connection to hub circuitry for receiving and buffering data for placement on a high bandwidth bus and connections to nodes.

FIG. 7 is a schematic block digram of a signalling processor in the hub and its connection to hub circuitry for switching data between the hub, nodes and a high bandwidth bus. In the embodiment of FIG. 7, the separated isochronous data 102 is stored in one of two buffers 132a, 132b. The timing of storage in the buffers 132a, 132b is coordinated with the 125 microsecond frame transmission timing so that data 102 from a first frame will be stored in the first buffer 132a during a first period of 125 microseconds and, during the next 125 microsecond period, the isochronous data 102 from the next frame will be stored in the second buffer 132b. The loading of the buffer 132 is dependent upon the number of nodes supported by the hub 44a. Bus 134 has sufficient bandwidth to carry the isochronous data output from a plurality of nodes which are connected to the hub 44a. In an embodiment in which the hub 44a is connected to 16 nodes, the bandwidth of the bus 134 must be sufficient to receive 1.536 bytes of data (i.e. 16 nodes×96 bytes per node) every 125 microseconds (i.e. every frame). This corresponds to a bandwidth of about 98304 Kb/sec.

Depending upon aspects of the system configuration, such as the number of nodes attached to a hub and the bandwidth dedicated to isochronous data, other embodiments of the invention could be provided with other bandwidths for the TSI bus 134. However, the 98304 Kb/sec bandwidth is particularly useful because it substantially matches the bandwidth employed in FDDI-II, 48 EI or 68 TI making it particularly easy to port the data on the TSI bus 134 to a TSI ring 58f (FIG. 3) in configurations where the TSI ring 58f is an FDDI-II system.

According to one embodiment, the data is conveyed from the buffer 132 onto the bus 134 in a time slot interchange fashion, and thus the bus 134 is referred to as a time slot interchange (TSI) bus.

As noted above, as data travels over the physical media 46, each 125 microsecond time period is divided into 512 equal time slots, each one of which is used to convey five bits of information (on average, conveying 4 bits of data and one timing bit). Thus, each 125 microsecond time frame on the physical media 46 contains 512 time slots, each of which has a duration of about 0.2441 microseconds. In contrast, the data carried on the TSI bus 134 is transmitted in 125 microsecond time frames divided into 1,536 time slots usable for isochronous data, each of which has a duration of about 0.08138 microseconds. Thus, during a 125 microsecond time frame in which the data from buffer 132a is being exchanged onto the TSI bus 134, it is necessary to control the timing of the output of data from the buffer 132a such that a given one of the bytes stored in 132a is passed to a latch for transmits on to the TSI bus 134 at the proper slot of the 1,536 time slots. Which of the time slots is "proper" depends on the use which is to be made of the data and, in particular, with the destinations for the data. The destinations for data, in the depicted embodiment, has been pre-established using the D channel information.

Data carried on the TSI bus will be loaded into one of the buffers 154a, 154b. The two buffers 154a, 154b are controlled to provide timing similar to the timing of the buffers 132a, 132b described above. That is, during a first time frame, the first buffer 154a will be receiving data from the TSI ring while the second buffer 154b is outputting data (which was stored during the previous time frame) for transmission onto the physical media 46b to the destination node 42a. During the next time frame, the roles of these buffers will be reversed such that data retrieved from the ring will be stored in buffer 154b and the data stored in 154a during the previous frame will be output for ultimate transmission to the destination node 42a.

After the hub has received data from a node and conveyed it to a location for transmission to the destination node or nodes, the data which is intended for the destination node may need to be placed in a form suitable for transmission across the physical media 46 if intended for an attached node.

Figure 9:
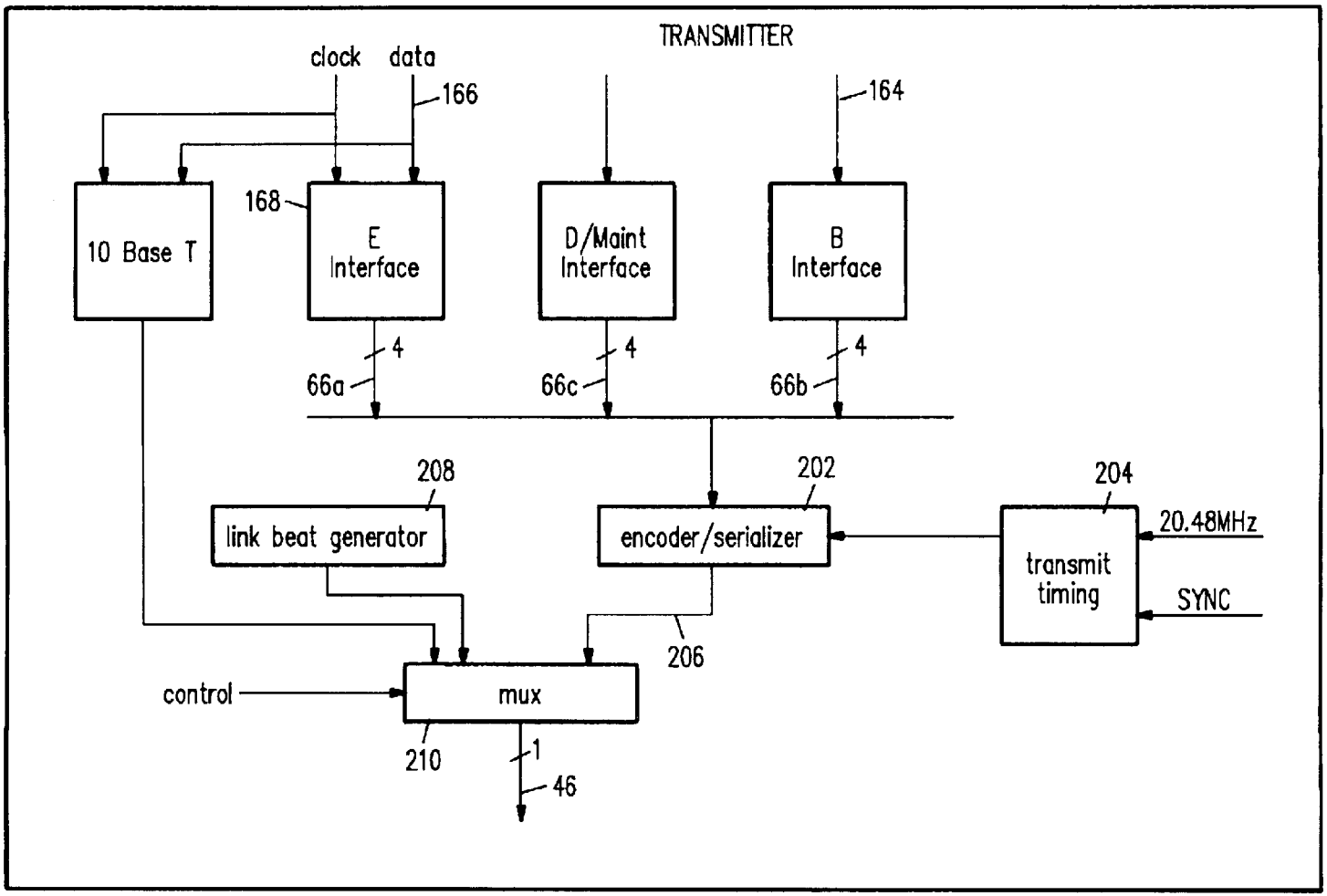
FIG. 9 is a schematic block diagram of a transmitter circuitry.

In the case of data 166 (FIG. 9) output by an ethernet repeater 60, the data is transformed by an E transmit interface 168 into a form 66a suitable for multiplexing with other data streams, such as an isochronous data stream 66b and D channel and M channel data bits 66c.

Figure 8:
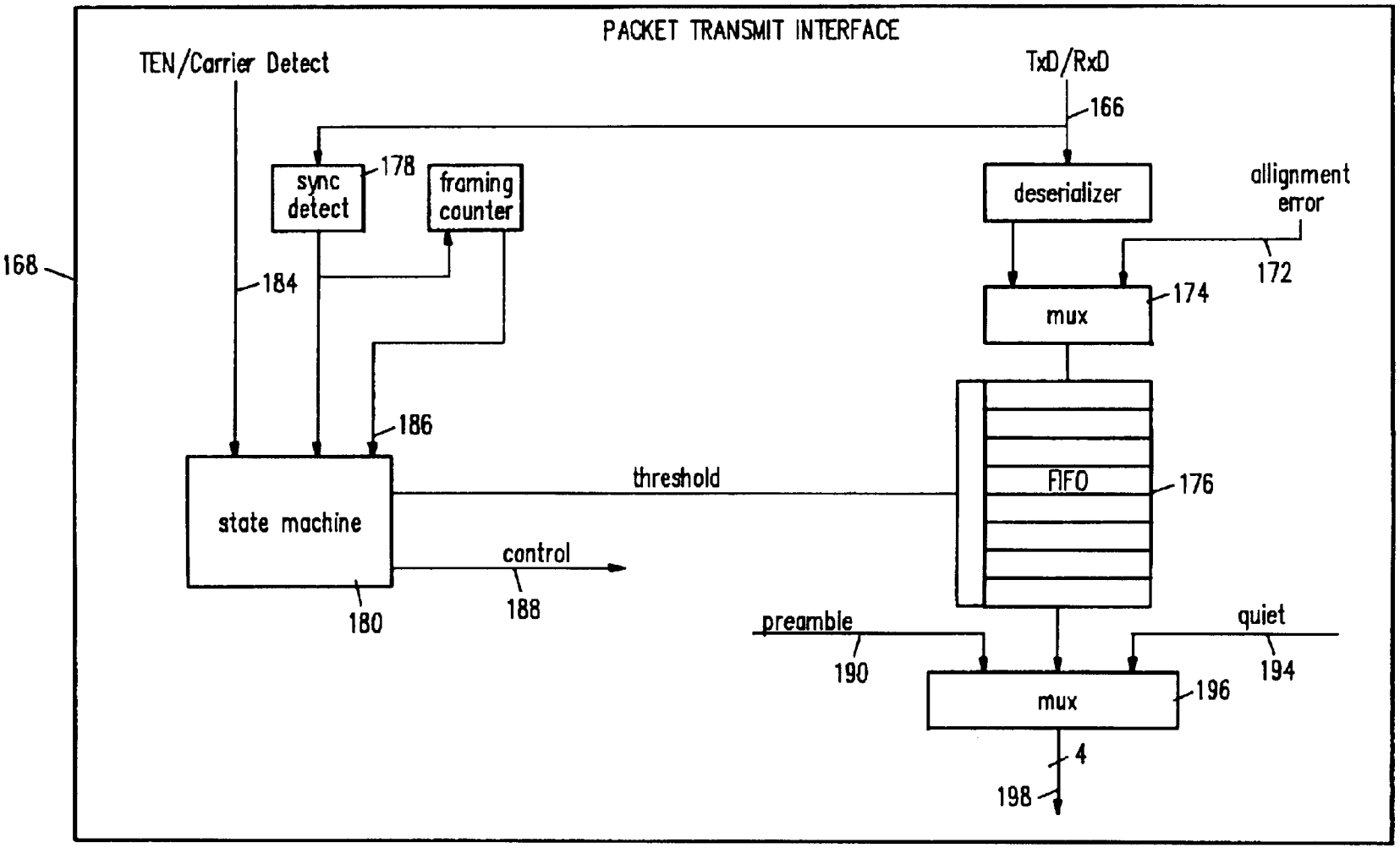
FIG. 8 is a schematic block diagram of a packet transmit interface according to an embodiment of the present invention.

An example of an E transmit interface 168 is depicted in FIG. 8. The transmit interface depicted in FIG. 8 is in general, the functional inverse of the E receive interface 59z depicted in FIG. 6. The data sent from the hub 44a to the nodes 42 is sent in a frame format which is preferably substantially the same as the frame format used for the data sent from the nodes 42 to the hub 44a as described above. At the nodes 42, the circuitry 50 includes devices (FIG. 4) for decoding and de-multiplexing data, similar to that described for performing these functions in the hub, mainly a phase lock decode 86, and NRZI decode 88, a four/five decode 90, and a demultiplexer 92. Decoded and de-multiplexed data is then delivered to the various data sinks in the nodes 42.

Figure 10:
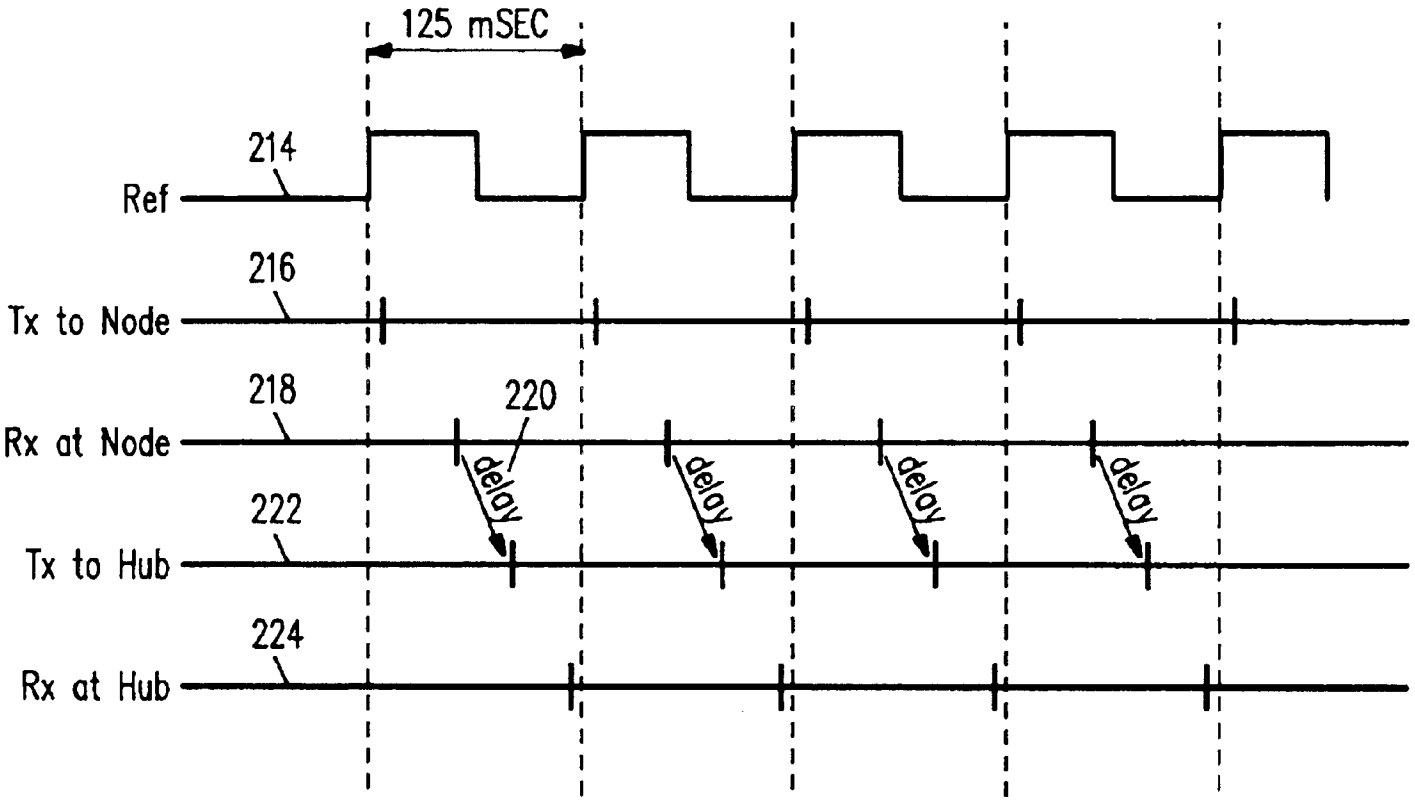
FIG. 10 is a timing diagram showing the relative timing of transmissions and receptions at the hub and nodes.

In one embodiment, it is desirable to control the timing of the transmissions from the nodes 42 to the hub 44 and those from the hub 44 to the nodes 42 to assist in reducing delay, jitter and minimizing the amount of buffering memory required. In particular, it is desired that the hub 44 should be able to transmit to the nodes, over media 46a, 46c, 46e at about the same time that data transmitted from the nodes over media 46b, 46d, 46f is received at the hub. FIG. 10 depicts a scheme for achieving this type of timing. As shown in FIG. 10, the timing can be synchronized with a 125 microsecond reference clock signal 214. In this example, the reference signal 214 provides an ascending clock edge every 125 microseconds.

Because of the line delays in the physical media, the time at which the nodes will receive the frame transmitted by the hub will lag the time when they were sent out from the hub as shown by time line 218 in FIG. 10. In order to provide for the desired timing described above, a delay 220 is introduced in the timing scheme before the node begins transmission of the next frame up to the hub 222.

Figure 11:
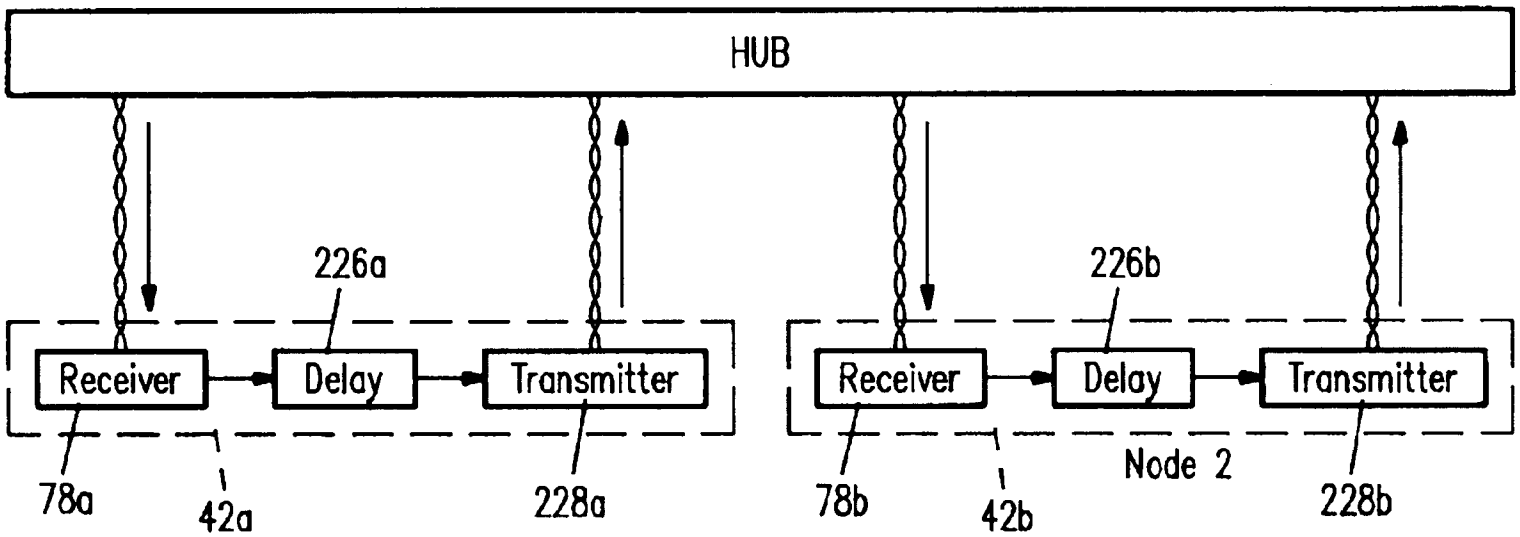
FIG. 11 is a schematic block diagram showing node receivers and transmitters coupled by a delay circuit.

One way of introducing the delay 220 is depicted in FIG. 11. The delay may be introduced by inserting delay circuitry 226a, 226b between the receiving circuitry 78a, 78b of the nodes 42a, 42b and the transmitting circuitry 228a, 228b of the nodes 42a, 42b.

Figure 2:
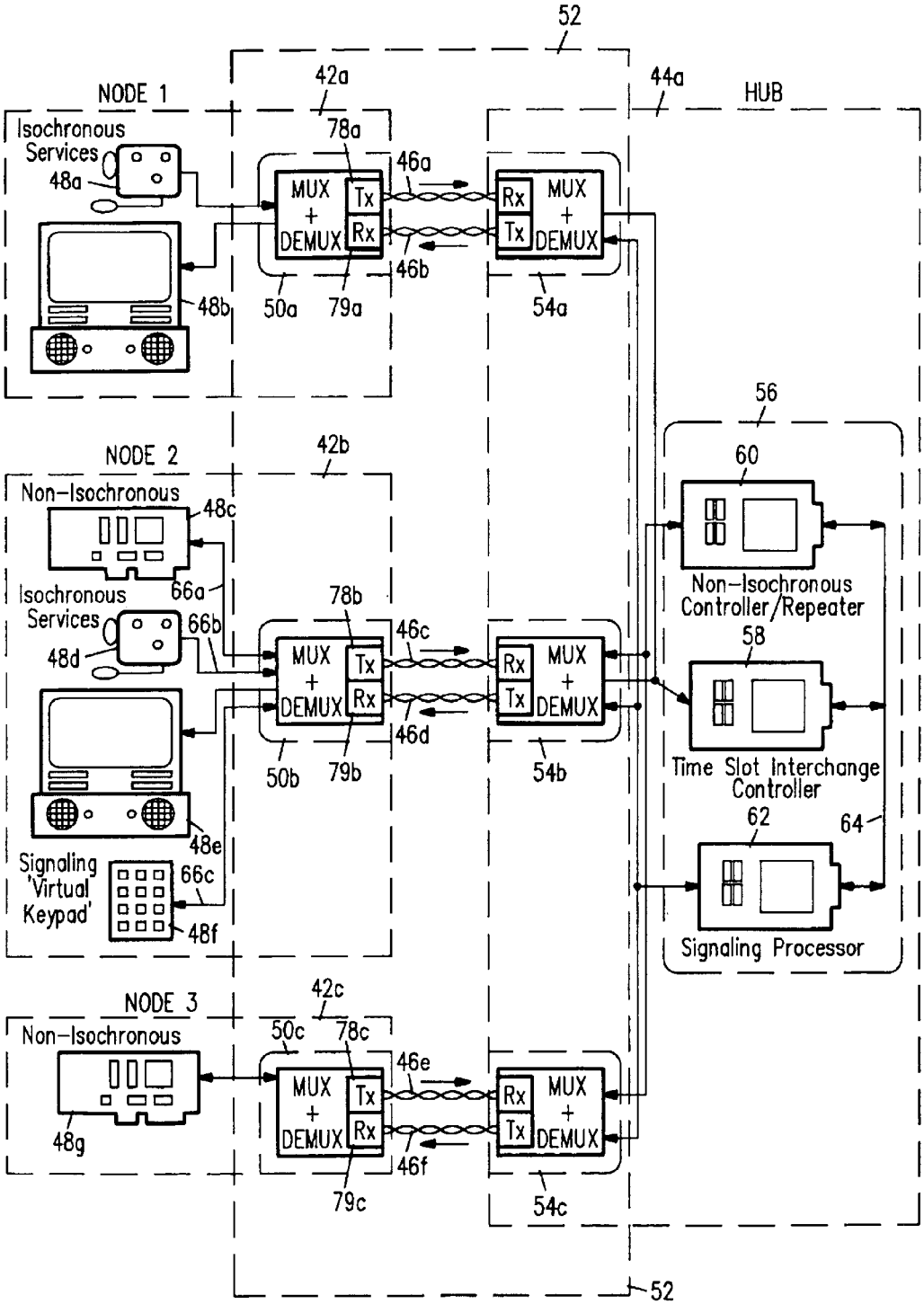
FIG. 2 is a schematic block diagram showing three nodes connecting to a hub according to one embodiment of the present invention.
Figure 12:
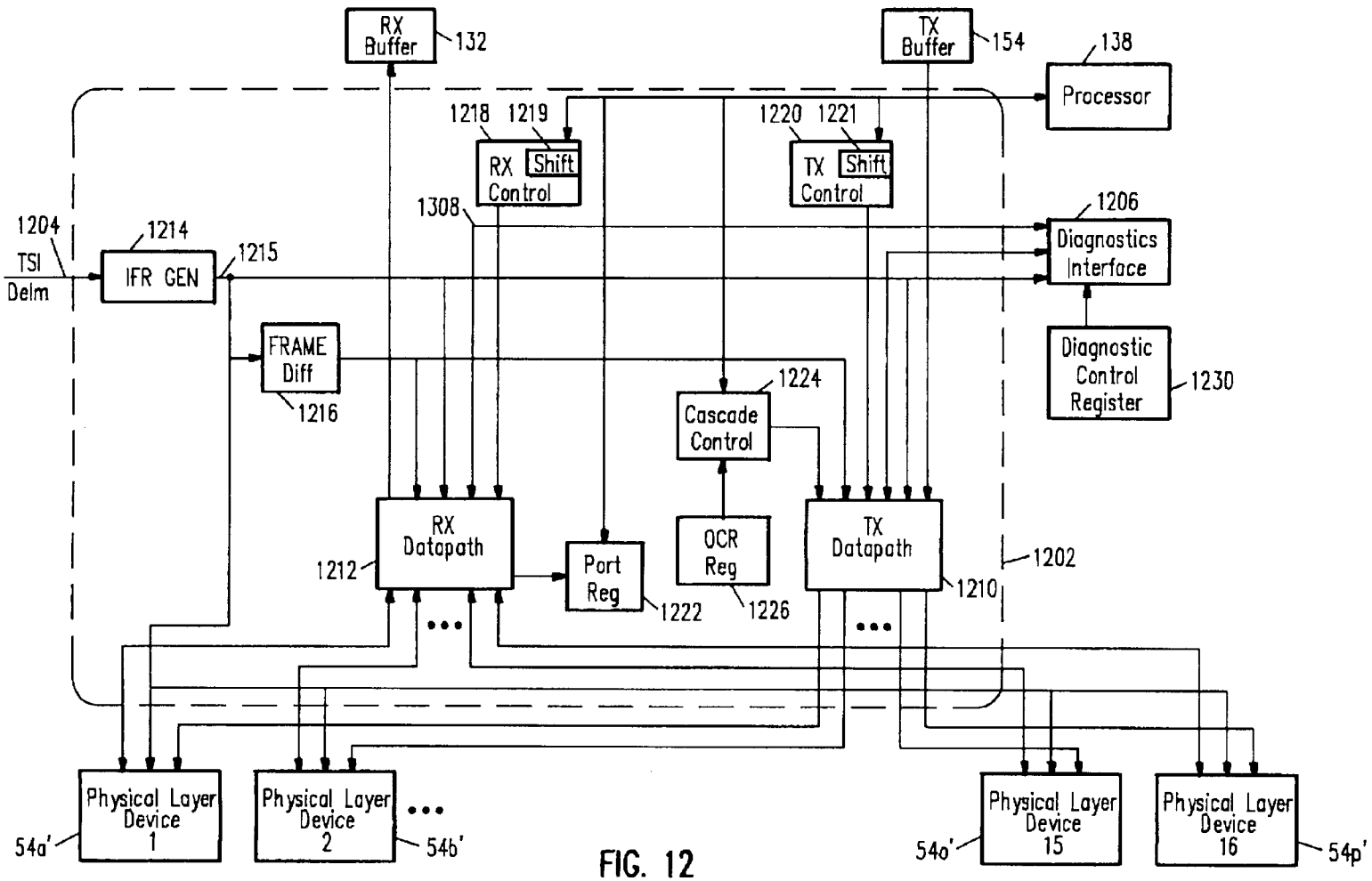
FIG. 12 is a block diagram of a transfer port according to one embodiment of the present invention.

As depicted in FIG. 12, the transport port 1202 communicates with the receive buffer 132 and transmits buffer 154, which are used, for example, for exchanging data onto and receiving data from the isochronous data bus, as described above. The transfer port communicates with physical layer devices which, as depicted in FIG. 2, communicate with the nodes. Specifically, the transfer port 1202 outputs data to and receives data from physical layer devices 1–16, depicted as 54a'–54p'. As described more fully below, the transfer port 1202 receives signals from, and optionally provides signals to, the processor 138 and also receives a TSI start delimiter signal 1204 indicating the start of a TSI frame or cycle. The transfer port 1202 also communicates with a diagnostics interface 1206 which is provided for the purpose of allowing port monitoring, link diagnostics (such as testing of a port) and connection memory diagnostics (such as testing the specialized isochronous switch data buffers).

In the embodiment depicted in FIG. 12, the transfer port 1202 includes a number of main components. The transmit datapath 1210 (depicted in FIG. 14 and described more fully below) is provided for transferring data from the connection memory or TX buffer 154 to the physical layer interface. The receive datapath 1212 (depicted in FIG. 13 and described more fully below) is provided for transferring data from the physical layer interface into the receive connection memory or RX buffer 132. Tables IV and V list the control signals depicted in FIGS. 13 and 14 and the function of each control signal.

The isochronous frame reference (IFR) synchronizing signal generator 1214 generates a frame synchronization signal to which data transaction between the physical layer interface and the isochronous switch circuitry is synchronized. This synchronizing signal is generated in a specific time window after the isochronous switch circuitry receives a frame synchronizing signal from the TSI ring (i.e., the TSI start delimiter 1204) or other backbone network. The physical layer frame slot differentiator 1216 steps through the physical layer frame template (described below) after the IFR is generated. The frame differentiator 1216 generates the control, valid B data and idle slots in the frame. The receive path control 1218 generates the control signals to receive bit serial data from the physical layer interface, to deserialize them and load them into the RX buffer 132 sequentially. It also generates control signals to reset the receive buffer pointers after data writes are complete and signal to toggle data buffers. The transmit path control 1220 generates the control signal to download data from the TX buffer 154, preferably at one word per clock cycle, serialize them, multiplex them with control and idle data and transmit them to the 16 outgoing physical layer interfaces. The port registers 1222 provide a register bank in which status information from the 16 physical layers are stored. It also contains registers where the processor can write the control data to be sent to the port address or can request status information for a port and conduct on-line diagnostic test activities. The cascade control 1224 provides control signals for controlling the cascade operation of multiple hubs described more fully below.

Figure 13:
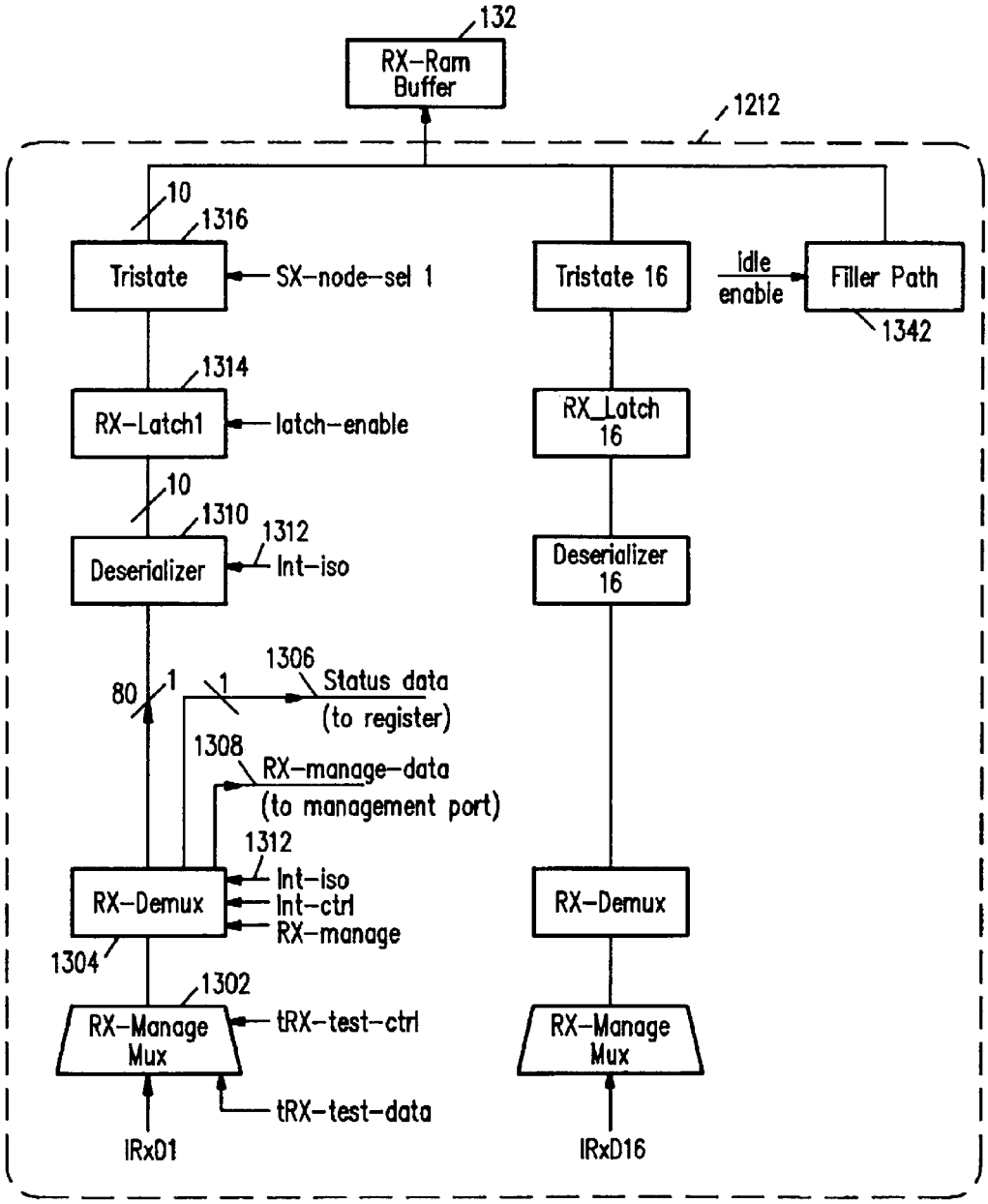
FIG. 13 is a block diagram of the receive pathway according to one embodiment of the present invention.

FIG. 13 depicts the receive datapath 1212. It includes a multiplexer ("mux") 1302, to select the management port data (in case of connection memory diagnostics) and bit serial data from the physical layer portion. This data is then fed to a demultiplexer 1304 which diverts data appropriately.

Status data 1306 is diverted to the register bank 1222, where each bits is decoded and written into an appropriate register. For each of the six status bits indicating port activity, low power mode, port isochronous capacity, P or physical layer portion interrupt and D interrupt, there is a corresponding register. The 6th status bit, indicating cascade mode for port 1, is used to control the cascade logic. Other ports cascade bits are ignored unless it has the appropriate logic to allow cascading of i hubs. Whenever a port's activity or capacity or power mode changes, an interrupt is generated. For P or physical layer and D channels interrupts are generated as long as the corresponding physical layer is waiting to be serviced and physical layer and D channel interrupt status bits are active.

An advantage of these registers 1222 is that they contain all the relevant status information belonging to all the 16 associated physical layer devices 54a'–54p'. Though the processor communicates with each of the physical layer devices 54a'–54p', it can get any status information about all or any individual physical layer device by a read operation on each of these registers, instead of polling the physical layer devices or receiving 16 interrupts from them. In addition, the processor can also request a physical layer device's complete status information, by giving a physical layer device address. For example, if any physical layer device's activity changes, it results in a single interrupt. The processor may read the corresponding register to determine all the active and inactive physical layer devices. In the absence of this mechanism the processor would have to either receive 16 interrupts, one from each physical layer device or poll the physical layer device. Hence, this method reduces the communication traffic with the processor.

If the data is intended to go to the diagnostics interface management port 1206, it is sent to management port 1308 for both the port link diagnostics and port monitor mode and to deserializer 1310. The B-channel data is loaded into the 10-bit deserializer 1310. Even if a physical layer device is not active, the data is enabled into the deserializer 1310. However, it is not loaded into the buffer 132. The advantage of this approach is using one signal line (int_iso) 1312 for all 16 physical layer datapaths, instead of a 16-bit bus. The other advantage of this scheme is that the data is diverted before deserialization. This permits using the serial position of data to identify the data. Thus the line from each of the physical layers into the status registers is a 1-bit line 1306, instead of 6 bits.

The tri-state 1316 provides the function of all sixteen ports being able to write to the RX buffer one at a time. The tri-state bus saves routing resource and silicon area.

Data loading into the RX-buffer 132 is ten bits parallel, i.e., from one physical layer port per cycle. Since a new slot of data comes in every 10 clock cycles and there are 16 data bytes to be loaded, an additional stage of buffers 1314 (rx_latch) in the receive datapath is provided.

Preferably, the mux 1302, demux 1304, deserializer 1310, latch 1314 and tristate 1316 are provided for each of the connections to a physical layer device (of which, in the depicted embodiment, there are 16). Only two of these (#1 and #16) are depicted.

Figure 14:
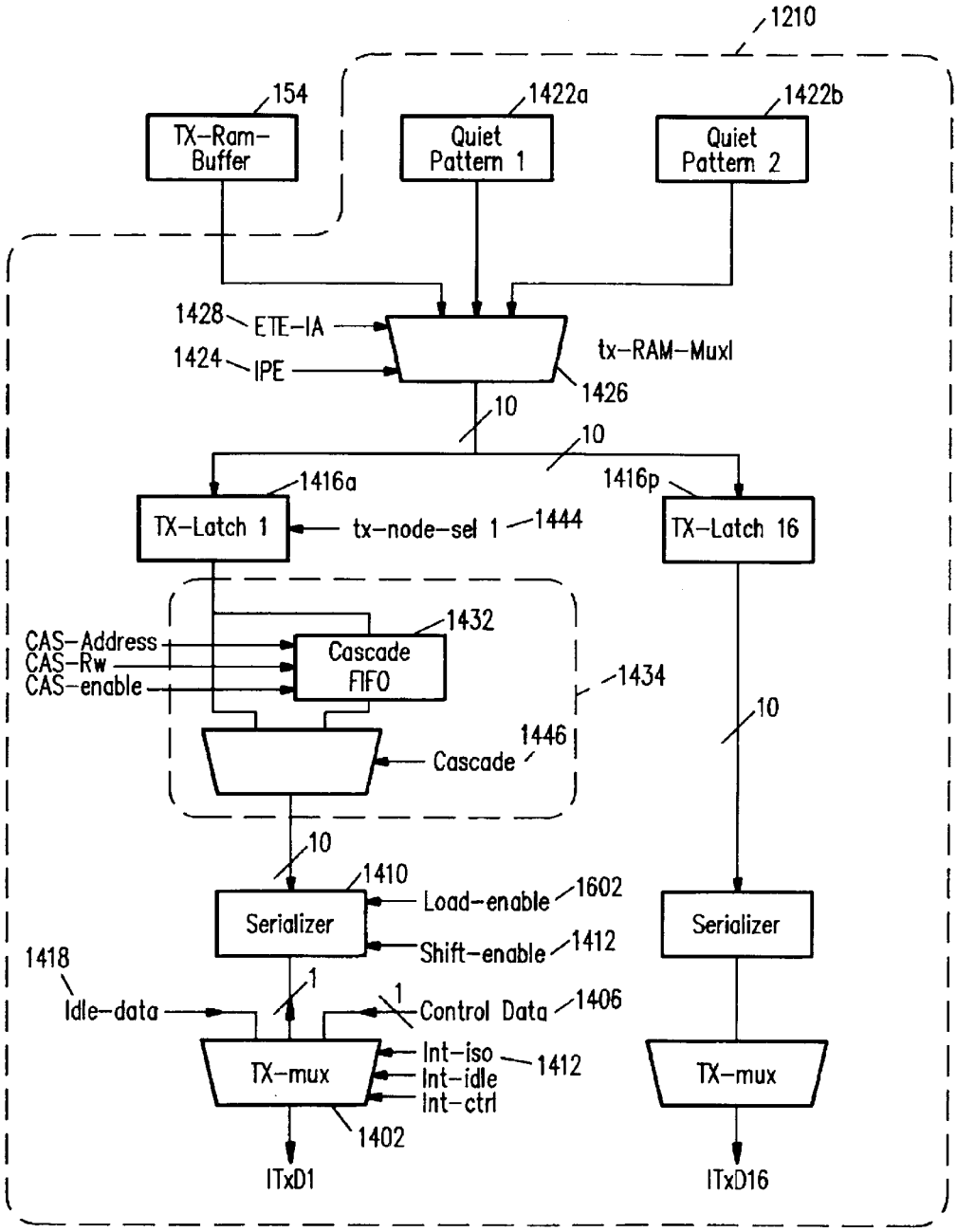
FIG. 14 is a block diagram of a transmit pathway according to one embodiment of the present invention.

FIG. 14 depicts the transmit datapath 1210. It includes a 10-bit register 1416, a serializer 1410 and a tx-mux 1402. Transmit data from TX-buffer 154 is loaded into register 1416. After all the 16 10-bit words have been loaded into the respective registers for the 16 latches 1416a–1416p, data is moved into the 10-bit serializer 1410.

The tx-mux 1402 multiplexes this B-channel data with control data 1406 from the Port Control data window register 1222 and idles 1418 in the idle slots of the frame, as described below.

The 'int_iso' signal 1412, which indicates valid B-channel, acts as the data-select signal for the tx-mux as well as the shift enable signal for the serializer.

If there is no valid B-channel data destined for a physical layer port (it may not be active, or it may not have a valid call connection set up) one of two "quiet" or "idle" patterns is sent to the port instead. The processor writes these two patterns, in two dedicated registers 1422a and 1422b. An Idle Pattern Enable (IPE) 1424 bit in TX-switch table 162, when set to 1, is used to indicate to a mux 1426 that idle data must be sent to the associated physical layer port. An ETE-IA bits 1428 in the TX-table 162 (used to indicate "external transmit enable/idle address") in ring-to-phy mode.

Since the ISO, control and idle data are multiplexed after serialization, data from the control register 1406 is bit serial to each physical layer port, thus reducing the bus lines, as described above for the receive pathway.

In one configuration, idle data is passed to the physical layer portion in the control slot (FIG. 15A). Preferably, the processor can send valid control data to a selected physical layer port. It can write a port's address and the control information into the 'port control data window register' (within the port register block 1222). In the next frame, this information is sent bit-serially to the appropriate port via the physical layer interface. This also holds good when port 1 is in cascade mode (described below) and its transmission is not in sync with the other ports.

Physical layer 1 can be configured for cascade mode when the associated physical layer is connected to another hub, instead of a node.

As described more fully below, transmit data buffering up to a frame is used for timing adjustments. This is done, using a 96-byte deep FIFO 1412 on the transmit side. The receive path structure, as well as the timings, are in sync with the other 15 physical layer devices. However, the transmit is initiated by the associated physical layer device. Transmit data is written into this physical layer port exactly as in non-cascade case, as described above. The isochronous transmit frame sync sent from the physical layer to the isochronous switching device initiates the data transfer to the physical layer portion. This signal triggers a cascade-frame-differentiator block, which operates similar to the normal frame differentiator and generates signals to indicate the B-channel, idle and control slots. The downloaded transmit data is stored in the FIFO 1432 and transmitted at the proper time. Other than providing the optional cascade circuitry for a cascade port 1434, all 16 sections of the transmit datapath can be substantially identical.

The transfer port 1202 also has an online diagnostic capability, through management port 1206. The processor can select the port that needs to be tested or it can also write into RX-RAM buffer 132 (in place of a port) and read from TX-buffer 154. Thus, any slot of the connection memory can be directly accessed for testing.

After power up, the transfer port 1202 comes out of reset, after automatic testing is complete for the RAM interval data buffers and the associated switch tables. After receiving the valid ring start-delimiter 1204, IFR 1215 is generated.

The above-described operation of the receive and transmit data paths are controlled by a number of signals output by the receive and transmit control blocks 1218 and 1220, respectively. The receive control block 1218 is triggered by the "frame differentiator" block 1216, at the clock cycle after every Iso data slot. This generates the control signals to sequentially load receive data from the 16 input physical layer interface ports into RX buffer.

The data select signals are generated, using a 16-bit walking 1-counter 1219, thus saving a decoder and decreasing the delay. In addition, the inherent shift property may also be utilized for testability purposes (e.g. for building a scan chain).

Figure 16:
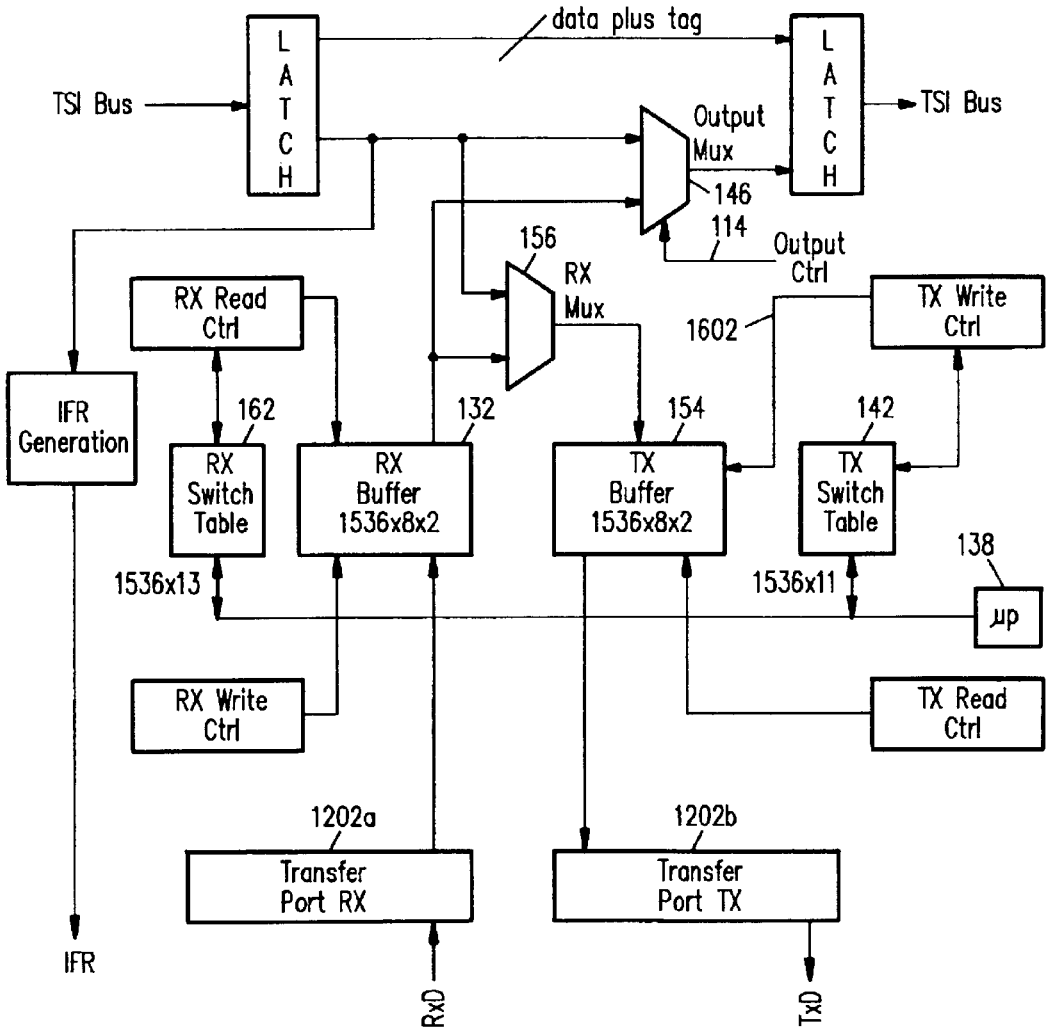
FIG. 16 is a block diagram of a signaling processor in the hub and its connection to hub circuitry for receiving and transmitting data.

If a physical layer is not active, an idle pattern 1342 is written into the RX-buffer 132. This is also true if the port is in port link diagnostic mode (when its data is diverted into the management port). The counter 1219 also generates the 16 cycle wide 'load enable' 1602 (FIG. 14) or the 'chip select' (FIG. 16) signal for the RX_ram buffer. If a port's data has "bad parity," data is loaded into the buffer. However, an interrupt, indicating that "bad parity is received" is generated. If data has "bad parity" there is an option to either regenerate new parity or let the bad parity also be written, into the RX-buffer.

The end-of-physical layer-frame is detected in the frame-differentiator 1216 and a flag is set in this block. After the frame has ended, data will continue to be loaded into the RX-buffer 132. After the last write, a 'reset' signal to reset the counter that generates the RX-buffer address is generated. The same signal is used to ping-pong the RX buffers 132a, 132b. This method saves a separate decode logic to decode the RX-counter to detect the end of frame. In a similar fashion, the transmit control block 1220 provides control signals for controlling the transmit data 1210. This block 1220 generates control signals to fetch data from the TX buffer for transmission to the 16 physical layers. To fetch the first 16 slots of data, this block 1220 is triggered by a signal, (TSI frame) which marks the end of data writes into the TX-buffer. To download the remaining 95 slots of B-channel data, a control signal is generated by the frame-differentiator block 1216, at the beginning of every ISO slot (except the 96th one). This ensures that 19 clock cycles are available to make sure that the 16 slots are fetched from the RAM and loaded into the serializer.

Figure 17:
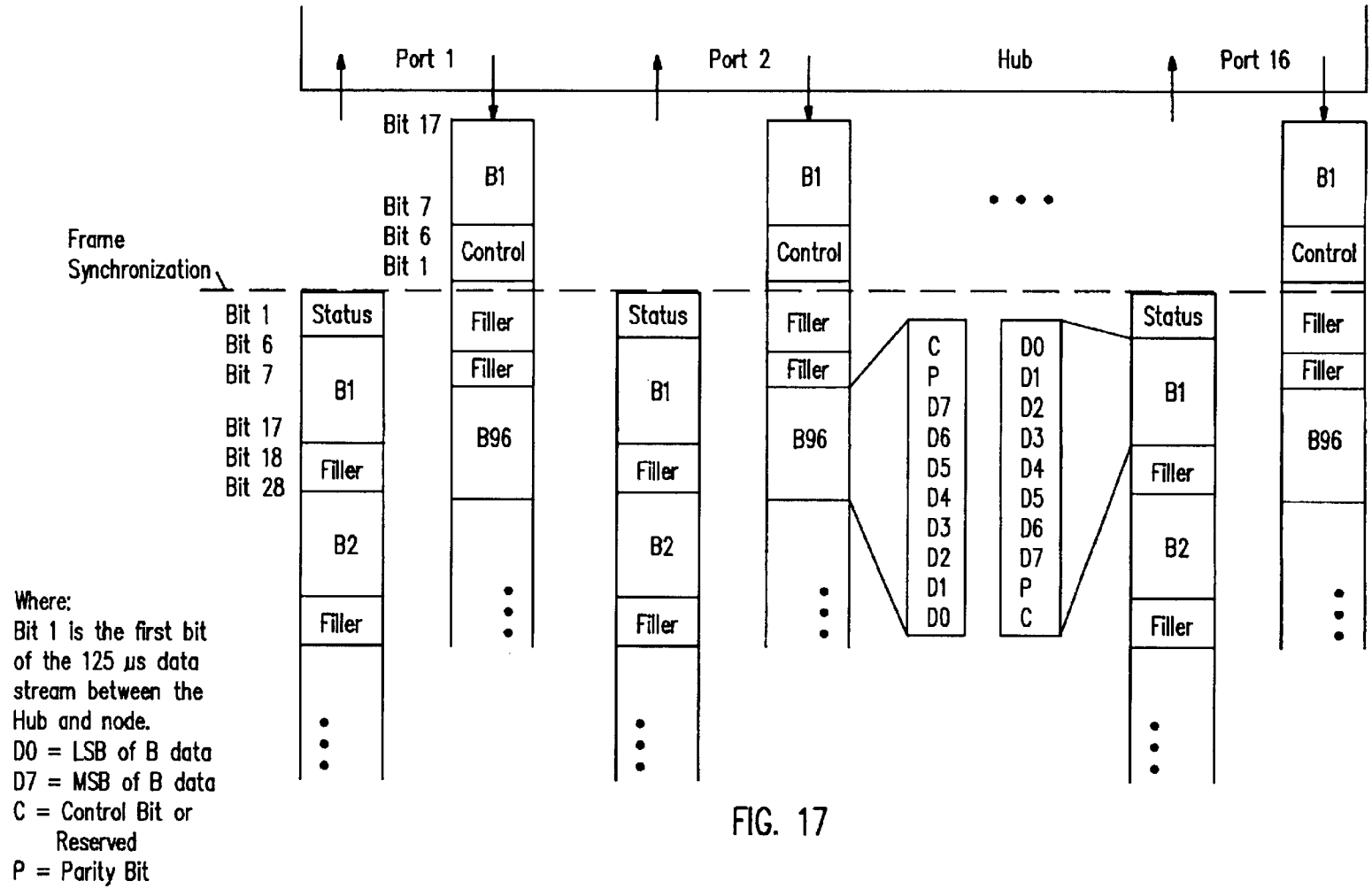
FIG. 17 is a schematic diagram depicting the synchronization between receive and transmit words.

The TX control 1220 has a 16-bit barrel shift counter 1221 that generates load enable signals into each of the 16 latches. The first bit of the first byte of isochronous data (B1) of all attached physical layer portions is received at the same time. Thus, 16 bytes of B data arrive at the isochronous switching device and are handled by the physical layer interface and transfer port. Likewise, all B data is transmitted to the physical layers simultaneously. The transfer port must build up the 16 physical layer port data prior to when it has to be passed to the physical layers via the port interface. FIG. 17 illustrates the isochronous data synchronization.

The serial data from and to the physical layer is synchronized at 20.48 Mhz clock rate. This clock is the rate at which data is received and transmitted between the physical layer and the isochronous switching device. The port interface converts the B data, either parallel to serial or vice versa depending upon the direction of the data. The 20.48 Mhz clock is also used for loading the receive incoming data buffer page and unloading the transmit outgoing data buffer page. The filler data (non B or Status/Control) in the data stream is used to provide a continuous data stream between the switch and physical layer portion. Both the physical layer and the isochronous switching device discard the received filler data. As seen in FIG. 15A, the first B data is available after the six bits of Status/Control data passed at the beginning of a frame data stream.

In the embodiment of FIG. 15A, on the receive side, the B channel data is received first followed by one bit of control or reserved bit and one bit of parity. The order of the B channel data is in increasing order: D0, D1–D6, D7 (MSB). On the transmit side, the B channel data is transmitted first followed by one bit of control or reserved bit and one bit of parity. The order of the B channel data in increasing order: D0, D1–D6, and then D7 (MSB). The parity can be odd or even parity generated on the 8 bits of B channel data. The attached node is responsible for generating the control and parity bit with respect to each B channel data byte transmitted to the hub. The hub simply transmits the 10 bits of data from the transmit buffer outgoing page to the attached nodes.

The receive buffer interface provides one slot (or B byte) worth of data to the TSI ring every 80 ns. The operating mode selects the source and destination of the slot data. If a port does not have a physical layer device connected to it, the RXD input should be tied to ground and the TXD output can be left floating.

Two programmable "idle" patterns 1422a, 1422b (FIG. 14) provides for the programming of any pattern for system and application flexibility. The programming of the "idle" data pattern is done by the operating software. One pattern might be "1111" which is a quiet pattern for audio codes. Likewise a "0000" pattern might be a quiet pattern for video codes.

The link activity bit (LA), when set indicates to the isochronous switching device within the hub that a "valid" or "good" isochronous link is active on the link at the associated port. When a physical layer detects a "good link," it transmits this state to the isochronous switching device within the hub in the status data of that port. Preferably, a change in the state of this bit will cause an interrupt to the processor unless masked.

The low power mode bit (LPM), when set, indicates to the hub that the node at the end of the link is in the low power mode. The node at the far end of the link must be brought out of low power mode when the isochronous switching device wants to send a D channel packet or isochronous data is destined for the node physical layer portion.

The capacity bit (CAP), when set, indicates that the attached physical layer has a particular bandwidth referred to as all-isochronous, such as the 15.872 Mbps isochronous bandwidth capacity. Preferably, a change in the state of this bit will cause an interrupt to the processor unless masked.

The DINT bit, when set, indicates that the physical layer's D channel receiver or transmitter needs to be processed by the host processor. Preferably, this bit being set will generate an interrupt to the processor unless masked. When the processor processes an interrupt from the physical layer or isochronous switching device, it first reads the Interrupt Status Register (ISR) to determine the source of the interrupt. Upon reading this interrupt and a D channel Interrupt indicated, the processor upon reading the Port D Channel Interrupt Register, will know which ports are requesting D channel servicing.

The PINT bit, when set, indicates that a physical layer device needs to be processed by the host processor. Preferably, this bit being set will generate an interrupt to the processor unless masked. When the processor processes an interrupt from the isochronous switching device, it first reads the Interrupt Status Register (ISR) to determine the source of the interrupt. Upon reading this interrupt and a Physical layer Interrupt indicated, the processor upon reading the Port Physical layer Interrupt Register, will know which ports are requesting Physical layer servicing.

FIG. 18 shows these status and control data bits. The LA, LPM, CAP, DINT, and PINT bits are stored in individual status registers which are read by the processor.

The change in the status of a physical layer port is implemented in the following manner. The port in which the change is detected is implemented in that cycle for the receive side of the isochronous switching device and in the next cycle for the transmit side of the isochronous switching device. For example, assume a cycle T has the Link activity bit (LA) not "set" indicating a non-"good" link state. Thus, the data received from that port is disabled or prevented from being loaded into the incoming page of the receive data buffer starting at cycle T and continuing until a "good" link is indicated. On the transmit side, however, the change in link state is not acknowledged until the next cycle, T+1. Thus, only valid data is loaded into the isochronous switching device receive data buffer. The data output to the port with the non-"good" link state has no impact since the link is in a state where the data is disregarded by the node.

The main purpose of the D channel is for call control or signaling, that is call set-up and release. The call control protocol traditionally uses an LAPD protocol through an HDLC controller over a serial link. According to one embodiment, the functionality of the D channel logic located in the physical layer replaces the function of the HDLC controller. Thus, the equivalent "HDLC controller" logic, in this embodiment, is contained within the physical layer and provides bit recovery, byte alignment, and error detection.

The physical layer integrates all the functions necessary for connection control D channel indicating flow control operations, framing, and cyclic redundancy generation and checking. The D channel packet is processed by the operating system and is transferred via the processor interface on the node. The D channel interface is full duplex and data is available via the physical layer's simple read/write port or DMA interface.

One byte of D channel bandwidth (64 Kbps) is available per frame. To prevent the overwriting of the D channel data, flow control has been provided on both sides of the link. The flow control gives the D channel logic's receiver control of the transmitter at the other end of the link, allowing a single Media Access Controller (MAC) to service several nodes if desired.

In one embodiment, the isochronous switching device is used to notify the host processor which of the node's D channel requires processing. Thus, the interrupt is centralized. This makes the D channel processing more efficient since a processor does not have to continuously poll all the physical layer portions for D channel activity.

The M channel provides the maintenance information (12 bits per frame) which passes between the hub and node physical layers. The isochronous switching device is used to centralize the attached node's maintenance interrupt via the PINT requests. This makes the M channel processing more efficient since a processor does not have to be continuously polling all the nodes for M channel activity.

As noted above, the physical layer frame generator is responsible for receiving a frame sync signal from the backbone ring or TSI ring and generating the corresponding frame sync signal, going to the attached physical layer portion. As seen in FIG. 17 the data transmission between the isochronous switching device and physical layer portion is synced to this signal. The frame signal is referred as IFR. In one embodiment, it is an active high signal, asserted for 8 20.48 Mhz clock cycles, once every 125 microseconds.

The TSI ring operates at 12.5 Mhz. In ideal operation, the typical ring frame duration alternates between 124.96 and 125.04 microseconds. Thus, the average frame length is 125 microseconds. This is achieved by alternating the number of preambles between 2 and 3. However, occasionally, the number of preambles can vary between zero and five: the ring start delimiter occurrence oscillates. The corresponding IFR is generated once every 125 microseconds, resulting in a typical frame of 2560 cycles of a 20.48 Mhz clock. IFR is always generated in a time window that lags the ring start delimiter by a known delay. The time adjustment due to the variable time delay between the ring start delimiter and IFR is made by this block, in integral number of the 20.48 MHz clock cycles. When consecutive start delimiters occur progressively sooner than 125 microseconds, IFR trails it progressively more. As soon as the time delay between the two signals is equal to 5 clock cycles (20.48 MHz), IFR is 'pulled forward' by shortening the on-going frame by 1 symbol or 5 clock cycles. This frame is a 'short frame' consisting of 2555 cycles, instead of the normal 2560 cycles. In this case, the frame has only 15 idles in the end. Instead of the normal 20.

Figure 19A:
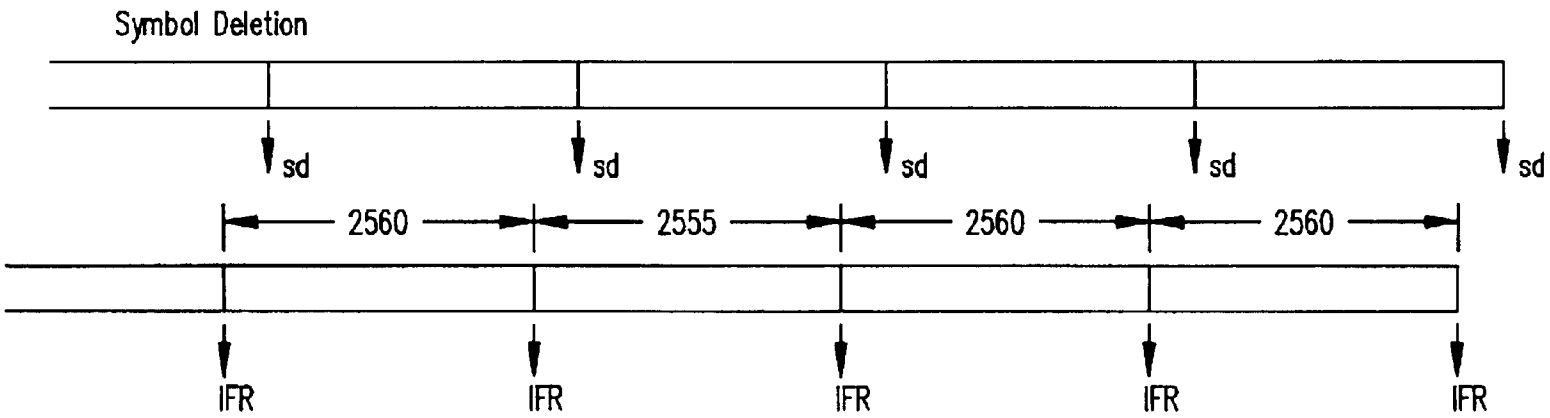
FIG. 19A and 19B are timing diagrams depicting symbol deletion and symbol addition configurations.
Figure 19B:
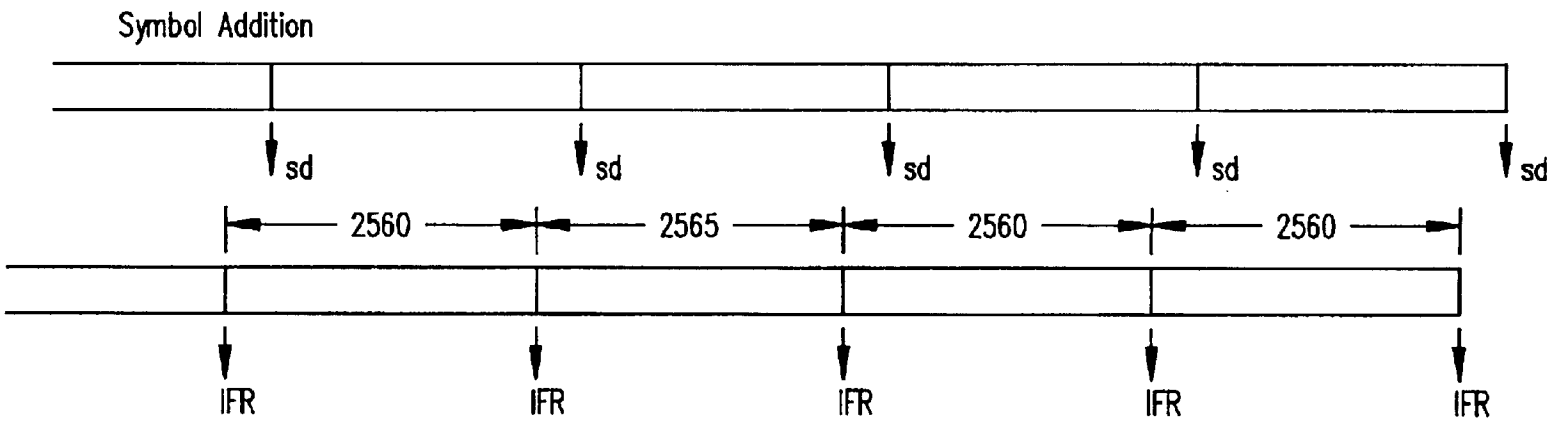

Conversely, if the ring start delimiter is received progressively later than the normal when the time delay equals about 244.1 nS (5 clock cycles), the on-going frame is elongated by a symbol, by adding 5 more idles at the end of the frame, to permit the frame length of 2565 cycles. FIGS. 19A and 19B give a pictorial description of this concept. In this manner, the frame sync generator block, translates the variable ring frame lengths on a 12.5 Mhz clock, to frames of specific duration on a 20.48 Mhz clock.

Figure 20:
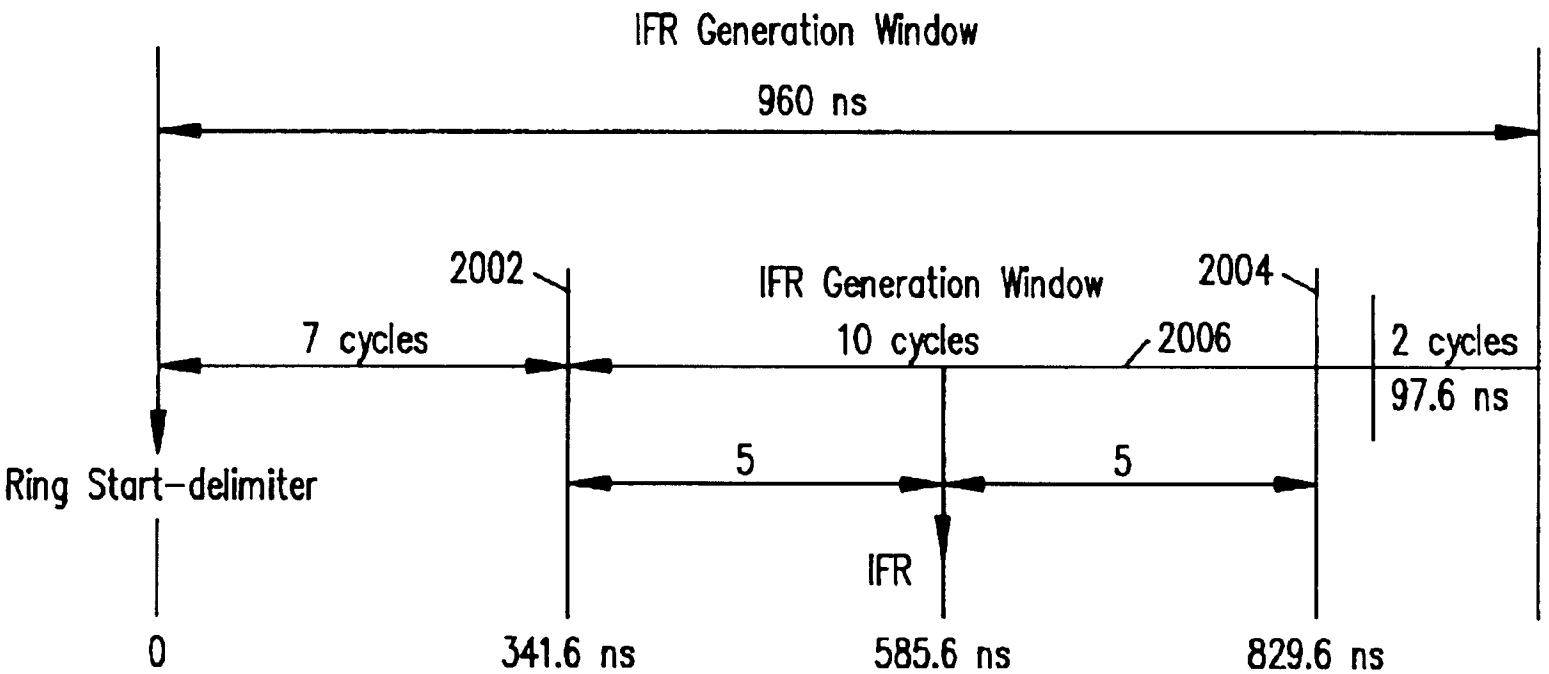
FIG. 20 is a timing diagram depicting the IFR frame generation window.

FIG. 20 describes the time window, for IFR generation. This is designed on the basis of the transmit data being available to be shipped to the physical layer and the receive data, to the TSI ring. The earliest that a start delimiter can occur on the ring is when there are no preambles. In this case, until 80 ns before the occurrence of the start delimiter, transit data is being written into the TX-RAM buffer 154. It takes 17 clock cycles, to fetch 16 bytes of B channel data and load it into the appropriate serializers, to be transmitted to the nodes. From the template, shown if FIG. 15, it can be seen that the first slot of B-channel data is sent to the nodes starting the 10th cycle after IFR. Hence, IFR has to lag the start delimiter by at least 7 cycles.

On the other side (switching receive data to the TSI ring slots), data switching from the RX-RAM buffer 132 begins 960 ns (12 cycles of a 12.5 Mhz ring clock) after the start delimiter. Hence, the receive data switching must by complete by this time. After the last slot of data from the 16 physical layer ports have been received, 17 cycles are necessary to write this data into RX-buffer 132. In case of the 'short physical layer frame' with only 15 idles, after the last slot of B-channel data, 2 more cycles are needed, after the next IFR has been generated, to load the last B-channel data. Only after this, can the RX buffers 132a, 132b be swapped, and this has to be done, before the first data payload slot begins on the ring (960 ns after start delimiter).

This marks the upper bound on how a late IFR can be generated, with respect to the start delimiter. These boundaries are indicated in FIG. 20. The IFR window 2006, which has to be 10 cycles wide (±5 clock cycles, for addition and deletion of a symbol), is placed at the center of this allowable boundary, as shown.

In one embodiment, block 1214 adjusts the delay between the start delimiter and IFR, such that IFR is generated within the time window indicated. When the start delimiter is trailing with respect to IFR, i.e., when start delimiter-IFR delay is decreasing, as soon as IFR moves out of the left boundary 2002, it is pushed into the 'optimum' window by adding a symbol. Conversely, when start delimiter-IFR delay increase, such that IFR moves out of the right boundary 2004, it is pulled back into the window 2006, by deleting a symbol.

In one embodiment, Block 1214 has a 13-bit main counter, incremented every clock cycle, to count up to 2565 cycles, thus traversing a TSI frame. When a start delimiter is received, it is synchronized to the physical layer interface 20.48 Mhz clock. With the first start delimiter (after power-up or reset or resuming normal operation after abnormal ring conditions), IFR is directly placed in its 'optimum' window 2006, by generating it, after 12 clock cycles. The subsequent IFRs oscillate in this time-window, IFR also triggers the main counter, which is incremented every clock cycle. When the next start-delimiter is received, depending on when it is received with respect to the on-going frame (i.e., with respect to the main counter's count), 1 of 3 flags, early/normal/late is asserted. For example, if the next start delimiter arrives on or before count 2543, (thus, indicating a start delimiter earlier than normal), the 'early', flag is set and the corresponding IFR is generated when the count reached 2543+12=2555, thus achieving a short frame. Similarly, when the start-delimiter is received, or after the count 2553, the 'late' flag is asserted and the corresponding IFR is generated when the count equals 2553+12=2565, thus achieving a long frame. When the start delimiter is received, between these counts, the 'normal' flag is asserted and the corresponding IFR is generated at count 2560, thus achieving a normal frame.

If no start delimiter is received till the count is 2565, it represents a missing or a late start delimiter on the ring side, and hence no IFR is generated. As soon as the next start delimiter is received, it is regarded as a fresh start and IFR is generated in its optimum window 2006. In addition, abnormal ring conditions can be handled.

An early TSI cycle happens when the start delimiter occurs much before its normal window of occurrence, chopping the on-going ring frame. In this case, in addition to the "start delimiter" signal, "TSI-early-cycle" signal is also received. The on-going physical layer frame is also terminated by generating the corresponding IFR, 12 clock cycles later.

A late TSI cycle occurs, when the start delimiter signal is not received even after five preambles on the ring frame. The frame-sync generator receives a signal called, "TSI_late_cycle". No IFR is issued. Upon the reception of start-delimiter, operation resumes.

In a Ring abort sequence, the start delimiter indicates an aborted TSI ring frame. However, on the transmit side, there is one page of good data to the physical layer interface (owing to the previous frame) and on the receive side, the RX-buffer is ready to receive new data from the physical layer interface. A flag is set, indicating that an abort sequence has been received, but the corresponding IFR is generated as in normal operation. If the next ring frame has a valid start delimiter, normal operation on the node end continues, resulting in one frame of data being lost or not switched on either side. If the next start delimiter also happens to be an abort sequence, then the operation comes to a halt, and no IFR is generated. Upon the reception of a valid start delimiter, the operation resumes from the start. The amount of frame's worth of data which is impacted is based on the number of abort sequences received.

Figure 21:
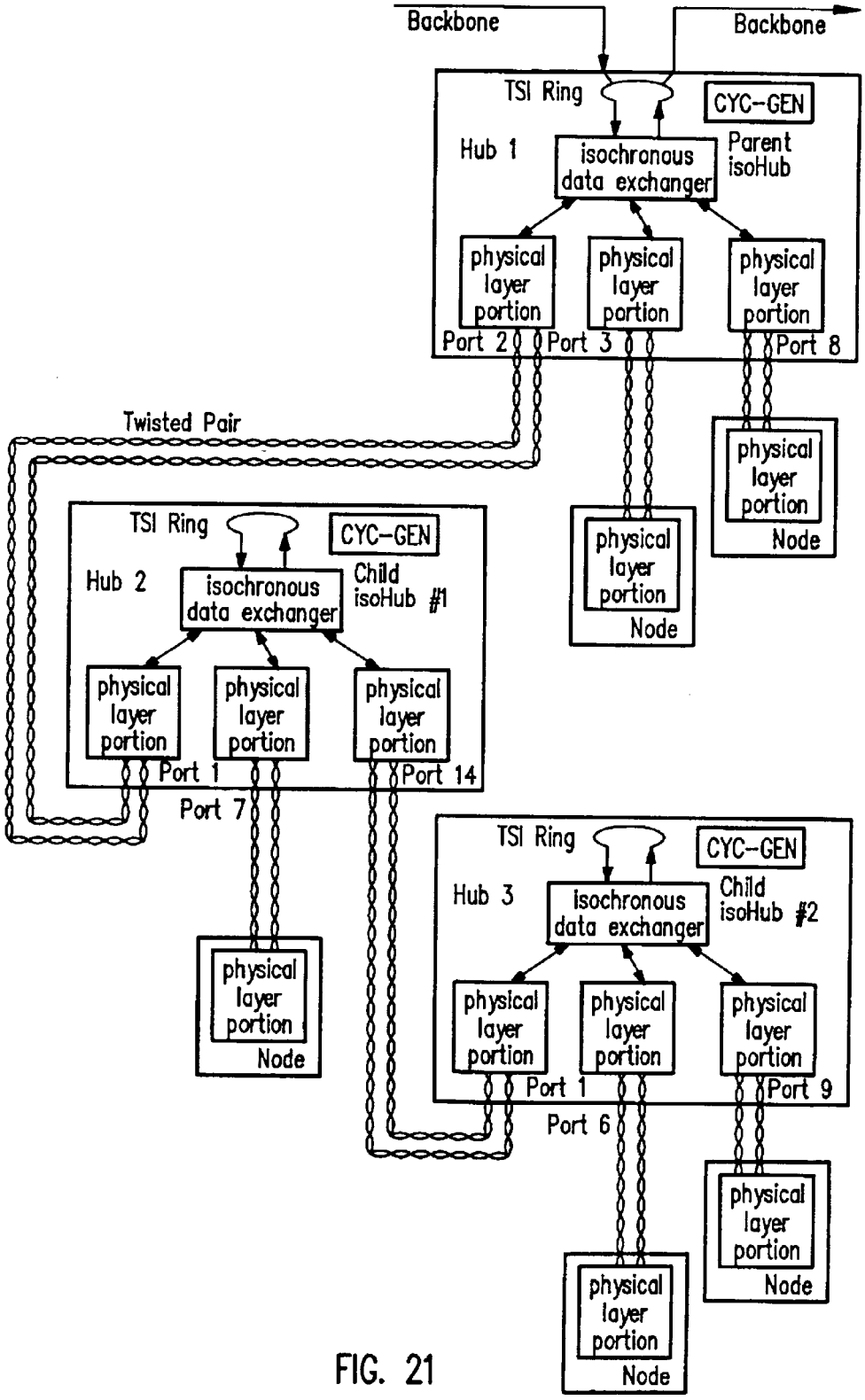
FIG. 21 is a block diagram depicting cascaded hubs.

As noted above, a cascade port, preferably provided on a single port, such as physical layer port 1, of each isochronous switching device or optimally located in the physical layer protion, permits cascading of a number of hubs, e.g. as depicted in FIG. 21. Using this capability, two or more switching devices such as hubs, each of which can be of a separate backbone network, can be connected. The cascade capability results in the need for a buffer in the transmit direction of the "child" hub and is preferably provided as an option on a dedicated cascade port such as port 1. Port 1 is preferably configured so that it can be in normal mode (where it can receive and transmit in synchronization with transmission to other nodes). When the cascade port is in non-cascade mode it functions the same as other ports. When it is in the cascade mode its data reception is in synchronization with all the other physical layer ports of the isochronous switching device. However, data transmission to the attached "parent" hub is not synchronized. Instead, it is initiated by a frame sync signal called isochronous transmit frame sync (ITFS). ITFS is sent from the attached physical layer to the cascade port of the isochronous switching device. Since the receive and transmit timings are considerably skewed (typically within the limit of a single frame) a first in first out (FIFO) buffer deep enough to hold up to 1 frame of isochronous data is provided in the isochronous switching device switch on the transmit side 1432 (FIG. 14). In one embodiment, the FIFO is implemented using a random access memory (RAM) 96 bytes deep and 10 bits wide. This configuration is useful when dealing with a configuration in which a data word is 10 bits and a frame consists of 96 bytes of isodata.

Referring to FIG. 14, data is loaded into the TX latch 1416a from the transmit buffer 154 as described above. If the cascade mode is enabled, data is loaded into the FIFO 1432 (whereas in normal mode, it is loaded directly into the serializer 1410). The advantage of loading data into the latch 1416a before loading into the FIFO 1432 is that the existing control signal 1444 remains the same. Since it is guaranteed that this data is not overwritten for at least 16 more clock cycles, the data write timing into the FIFO is more robust and the write window is 16 times larger than it would otherwise be. Under control of the cascade signal 1446, data is loaded into the serializer 1410 either from the cascade FIFO 1432 or the latch 1416a.

Referring to FIG. 12, the cascade control 1224 has two counters, both being 7-bit counters, to permit counting up to 96. One counter generates the read address and the other generates a write address. The FIFO 1432 receives a chip select signal which is asserted whenever either a read or a write operation is undertaken. The FIFO 1432 also receives a CAS-RW signal. This signal has a high (logic 1) value during a read operation and low (logic 0) value during a write operation. Both of the counters in the control 1224 are initialized to 0.

During a write operation the enable signal 1444 for the latch 1416a is used both for loading data into the latch 1416a and is also used to increment the write-count counter and generate a write enable signal. The enable signal 1444 is also delayed by 1 clock cycle and the delayed signal is used as the chip select signal for the FIFO 1432. The CAS-RW signal is set to 0 and data is loaded into the FIFO. The reset signal for the write counter (causing the counter to "roll-over" to 0) is the same signal used to reset the counter that generates addresses for downloading data from the RAM buffer 154. An advantage of this configuration is that a separate 7-bit decode logic and logic to reset the counter in case of early TSI cycles is not required.

A read operation for the FIFO 1432 is initiated by the ITFS signal which is the 8 kilohertz synchronization signal received from the physical layer. This signal is asynchronous with respect to IFR 1215. ITFS marks the beginning of each frame of the "parent." This signal is sampled at two consecutive clock edges by the control logic 1224, in order to insure that it is not a spurious signal. After validating this synchronization signal, a CAS-frame differentiator circuit is triggered. This circuit is responsible for stepping through the frame and differentiating the different types of data slots (such as control and idle). The circuit 1216 generates a control signal to trigger the read-counter for each of the 96 slots in the frame, i.e. the read counter generates addresses for each FIFO location. This signal is generated at specific times (in clock cycles) before each of the isochronous slots. This signal also generates the read enable signal and the chip select signal for the FIFO. One clock-cycle-delayed trigger signal generates the enable signal to load data into the serializer 1410. The cascade frame differentiater block generates a reset signal for the read counter at the end of each frame, thus avoiding extra decode logic.

It is possible for read-write contention to occur, for example, when there is a read as well as a write operation scheduled at the same time. Such contention is detected when the signals WR-enable and RD-enable are asserted together. Preferably, read operation is given the higher priority since write data is preferably guaranteed to be stored in the latch 1416a for a minimum of 16 clock cycles. The read operation takes place as for other types of ports. The contention flag signal itself is delayed and used as write enable signal. The write operation is then performed normally.

Figure 22:
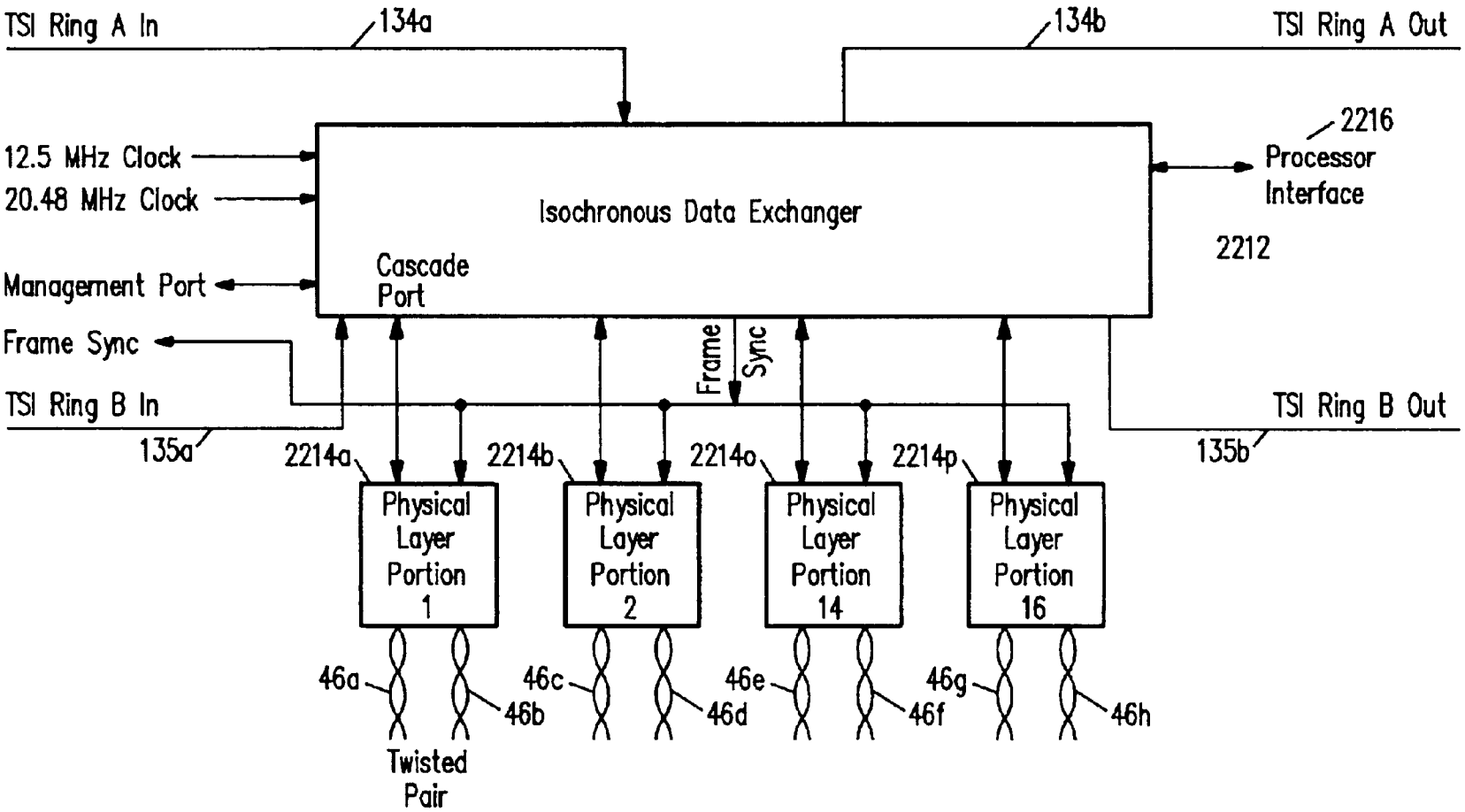
FIG. 22 is a block diagram of an isochronous switching device and an attached physical layer portion frame with a TSI ring a and a TSI ring b, according to an embodiment of the present invention.

The present invention can be implemented in a number of fashions. In one embodiment, an isochronous-capable network can be implemented using a chip set which includes three members: a repeater interface controller, such as Model DP83950A available from National Semiconductor, Santa Clara, Calif. and described in National Semiconductor Local Area Network Databook, 1992 Edition, pages 3-3 through 3-73; an isochronous switching device chip 2212 (FIG. 22) and one or more physical layer portion chips 2214a–2214p. The depicted isochronous switching device 2212 may be used to implement a 1537×1537 time slot data exchange. This device may be used to switch data between two TSI rings, such as TSI ring A 134a, 134b and TSI ring B 135a, 135b, or between one TSI ring 134a, 134b and up to 16 attached isochronous physical layer ports. All 16 ports support 6.144 Mbps of isochronous data. The isochronous switching device may also be configured to support one port of 15.872 Mbps isochronous data and 13 ports of 6.144 Mbps isochronous data. The isochronous switching device 2212 handles the status/control and isochronous bearer (B channel) data to and from the physical layer. The connection control (D channel) and maintenance (M channel) data and functions are handled in the physical layer devices 2214a–2214p. The isochronous switching device 2212 provides TSI ring status, link status and error reporting. This information is transferred to the attached host processor via a register interface 2216 and interrupts. The processor interface 2216 also provides access to the switching device switch tables and status/control registers. At least one switch table slot update is guaranteed per 125 microsecond cycle.

In one embodiment, the isochronous switching device 2212 supports two data switching operation modes, which are listed in Table VI.

The first mode listed in Table VI also provides two different port interfaces or selections. The first port interface ("regular") supports 16 ports, each with 6.144 Mbps isochronous bandwidth. This is the default port interface. The second port interface ("mixed") supports one port with 15.872 Mbps isochronous bandwidth and 13 ports of 6.144 Mbps isochronous bandwidth. The 15.872 Mbps allows the isochronous switching device to provide a greater isochronous bandwidth for applications which require more than 6.144 Mbps, such as video servers, coding translators, and HDTV.

Figure 23A:
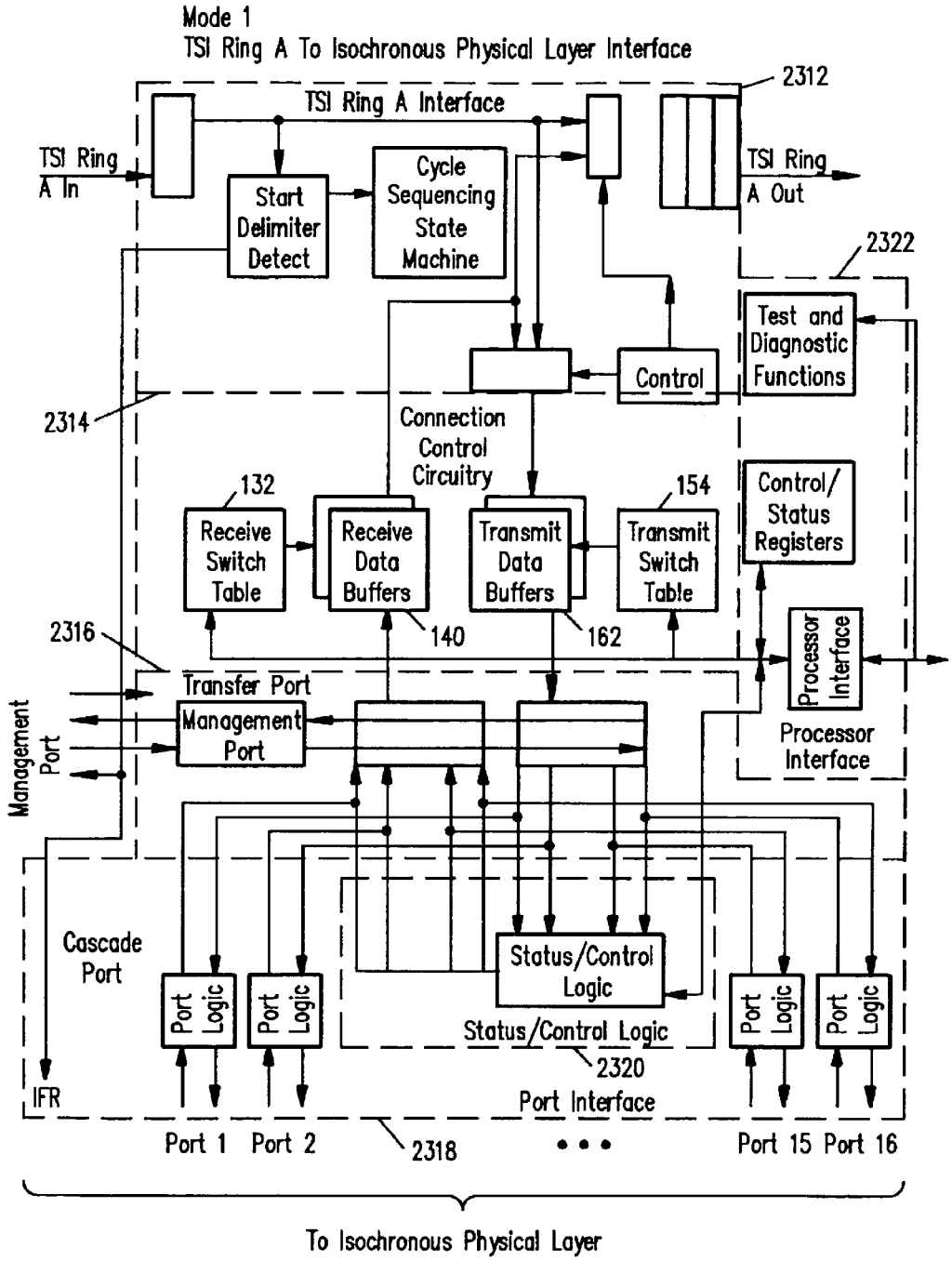
FIG. 23A is a block diagram showing the interface between a TSI ring and an isochronous physical layer according to an embodiment of the present invention.

FIG. 23 depicts the connection of various functional units of the isochronous switching device 2122 when the isochronous switching device 2212 is configured in mode 1. The functional units include the TSI ring A interface 2312, the connection control circuitry 2314, the transfer port 2316, the port interface 2318, the status/control logic 2320 and the processor interface 2322.

Figure 23B:
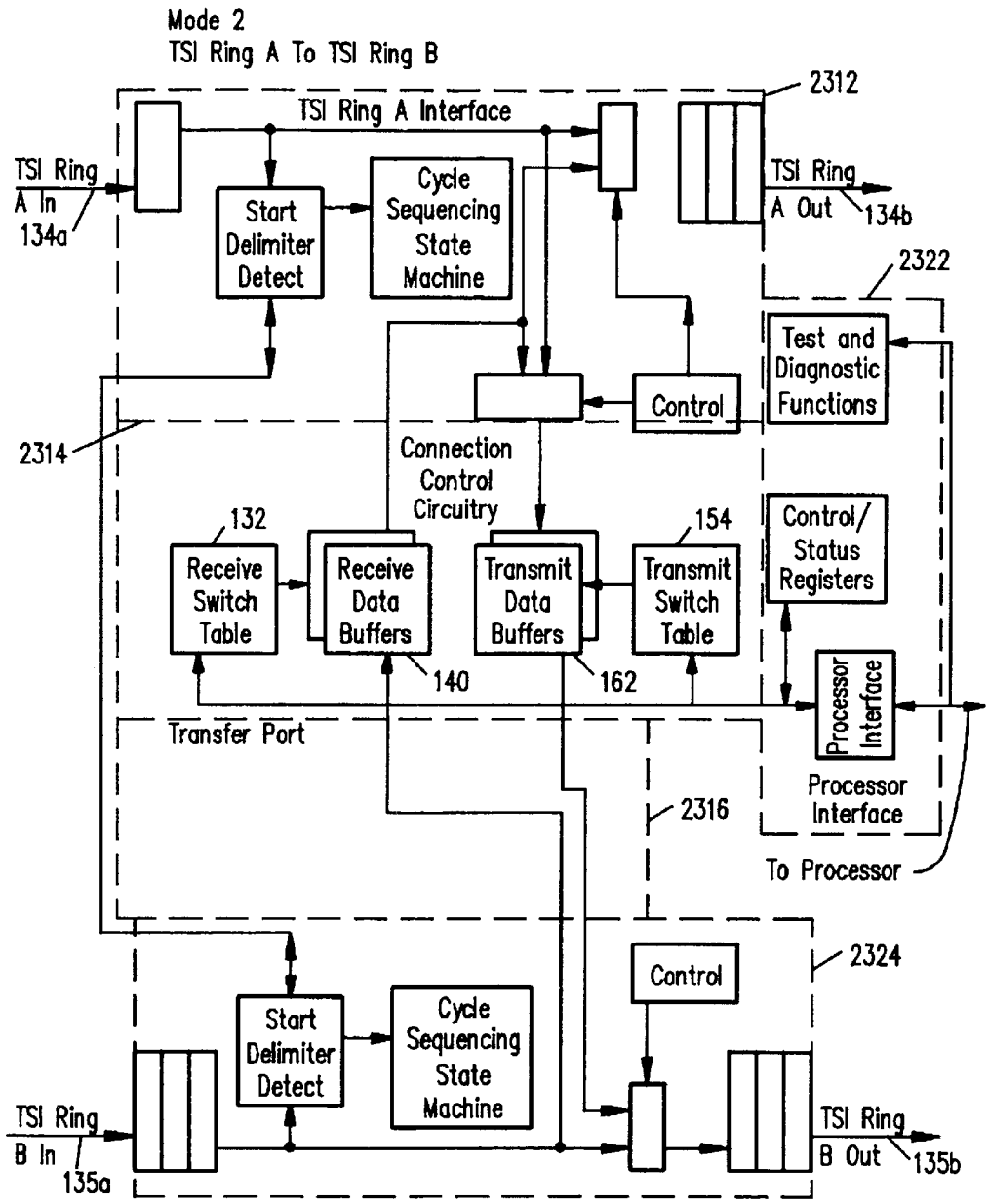
FIG. 23B is a block diagram depicting circuitry for connection of a TSI ring a to TSI ring b.

FIG. 23B depicts the relationship of the functional units when the isochronous switching device 2212 is configured for switching data between two TSI rings.

When the isochronous switching device 2212 is in the first mode, two port selections can be provided, regular or mixed (see Table VI). In regular port configuration, data can be provided according to the frame depicted in Table IA. In mixed port configuration, data can be provided according to the frame depicted in Table IA and IB.

The isochronous switching device 2212 receives four types of data from the TSI ring. These data types are the cycle header, isochronous maintenance channel (IMC), isochronous slot data and packet data. The IMC and isochronous slot data are time slot exchanged by the isochronous switching device 2212. Table VII lists the data, definitions and bandwidth for the TSI ring.

In regular port configuration, the off-loading on the transmit side is different than on the receive side. The transmit buffer loads in the following order: IMC in buffer location 0H, slot 1 in location 1H, slot 2 in location 2H . . . slot 1535 in location 5FFH and slot 1536 in slot location 600H. The receive buffer loads in the following order: filler in location 0H, port 1, B1 in location 1H, port 2-B1 in location 2H . . . port 16, B1 in location FH. Then the cycle begins again for B2 for all ports. This continues until the 96th B data is loaded for each of the 16 ports. Table VIII shows the receive and transmit data buffer correspondence.

In mixed port configuration, the receive buffer loading on the transmit side is also different than on the receive side. The transmit buffer loads in the following order: IMC in buffer location 0H, slot 1 in location 1H, slot 2 in location 2H . . . slot 1535 in location 5FFFH and slot 1536 in slot location 600H. Table IX shows data buffer loading sequence for the transmit side as well as the buffer loading sequence for the receive side.

In mode 2 (ring-to-ring) each buffer is loaded in the same order. The transmit buffer loads in the following order: IMC in buffer location 0H, slot 1 in location 1H, slot 2 in location 2H . . . slot 1535 in location 5FFH and slot 1536 in slot location 600H. Likewise, the receive buffer loads in the following order: IMC in buffer location 0H, slot 1 in location 1H, slot 2 in location 2H . . . slot 1535 in location 5FFH and slot 1536 in slot location 600H.

FIG. 24A and 24B depict the configuration of the receive switch table and the transmit switch table, respectively, when the isochronous switching device 2212 is configured in mode 1. The same switch table configurations are used for both regular and mixed port configurations. The contents of the receive and switch tables when the isochronous switching device 2212 is in mode 2 is depicted in FIGS. 25A and 25B.

Figure 26:
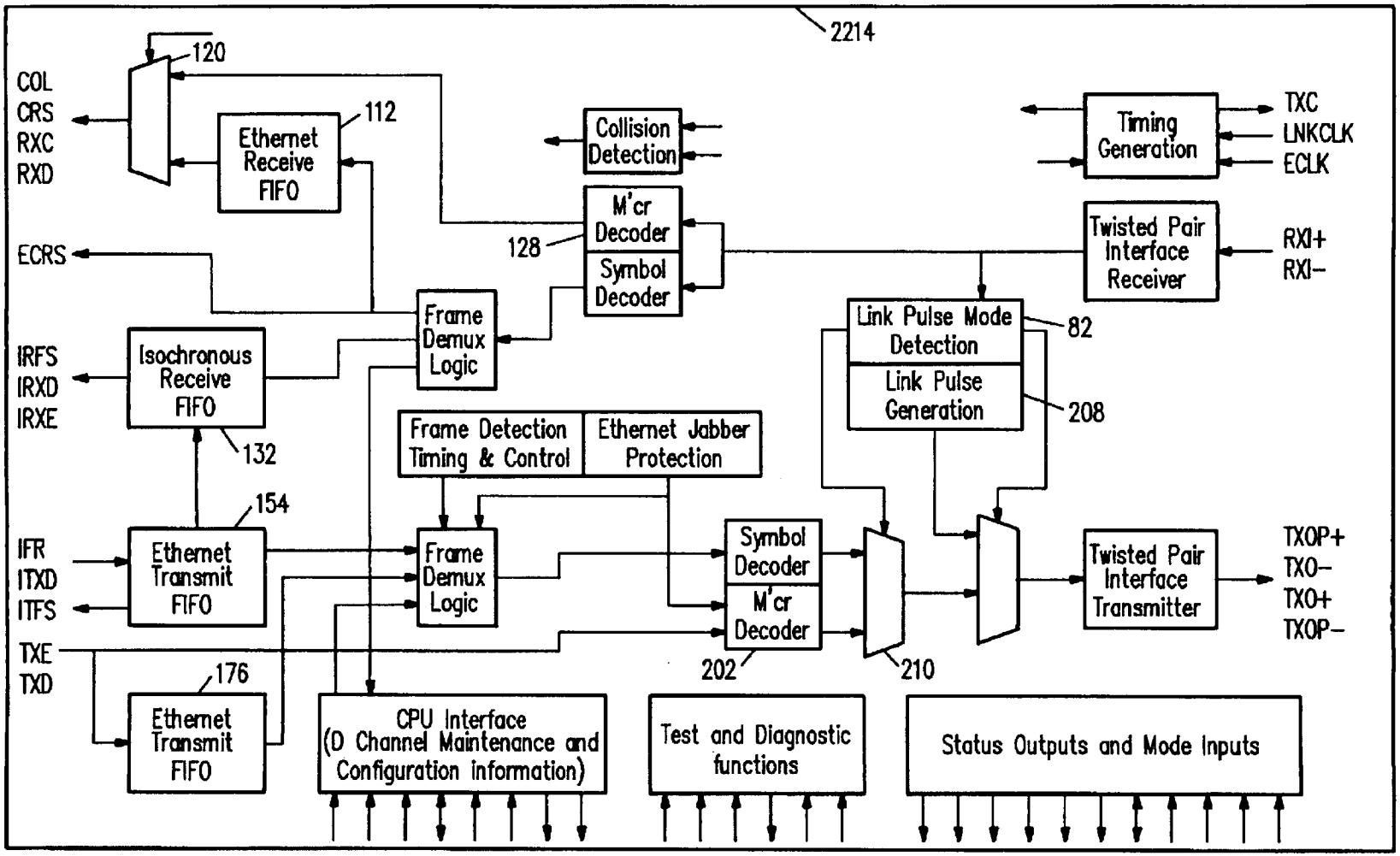
FIG. 26 is a block diagram showing the configuration of a physical layer portion according to an embodiment of the present invention.

FIG. 26 depicts the configuration of a physical layer portion chip 2214 according to an embodiment of the present invention. The device integrates all the functions necessary to access the three services described above: a 10 Mbps 802.3 packet channel, a 6.144 Mbps isochronous channel partioned into 96 duplex 64 Kbps bearer "B" channel and a duplex 64 Kbps data "D" channel. Preferably, the physical layer portion chip 2214 supports a number of operational modes including isochronous/ethernet mixed mode, 10 Base T only mode, isochronous only mode and ATM mode. Table X provides a description of the various input and output signals depicted in FIG. 26.

In light of the above description, a number of advantages of the present invention can be seen. The transfer port maps the physical layer frame, operating at 20.48 Mhz, to the TSI frame, operating at 12.5 Mhz, by doing all the required timing adjustments. It generates the physical layer frame sync signal, corresponding to the ring start delimiter, such that data availability for transmitting to physical layers and to the ring is guaranteed. It receives physical layer data bits serially, and groups and writes them so that they can be switched onto the ring, as a 10-bit word, it takes advantage of the physical layer frame template, to group and write them so that they can be switched into the ring, as a 10-bit word. It takes advantage of the physical layer frame template, to group and write data to the RX-RAM buffer, in bursts of 16 bytes. Data loading takes place, starting with the idle slot following each B-channel, and extends into the next B-slot. Data loading is 1 word per clock cycle, instead of 16 bytes being written in parallel. This results in a 10-bit bus, into the RX-buffer, which is used by the 16 ports, instead of a 160-bit bus. This also simplifies the RAM implementation. The converse is true in the case of data fetching from the TX-buffer.

As described earlier, the data multiplexing and demultiplexing takes place when the B-channel data is bit-serial. This results in smaller mux/demux logic, as well as 1 (instead of 10- or 6-bit wide bus) signal line, for control/status or idle data. Whenever the processor changes any physical layer-related activity, such as altering the management diagnostic activity mode or selecting another port, these changes are reflected beginning the next frame. Thus, there is no abrupt data transition in the middle of the frame. This is accomplished using shadow registers, when necessary. Whenever a port becomes 'active' (this information is conveyed in the status bit to the isochronous switching device), its receive data (RXD) is written into RX-RAM buffer, in the same frame itself. Thus, no data from the node is lost.

The present invention, according to one embodiment, also provides a method of translating the varying TSI ring frame lengths into the physical layer frame, such that an adjustment is made in terms of "a symbol" or four clock cycles. Ring frame length variations are propagated by designing an IFR window which guarantees data availability for switching into the ports and the ring, even in the extreme TSI ring frame variations of zero to five preambles. At power-up or after reset or while resuming operation after abnormal ring conditions, IFR is directly placed at the center of its valid time-window 1. Thus, no time in terms of the number of frames is lost, in pulling the IFR inside the normal window, by addition/deletion of symbols.

Although the present invention has been described by way of preferred embodiments and certain variations and modifications, other variations and modifications can also be used, the invention being defined by the following claims.

TABLE 1A

| | | | | | | | | | | | | | | | | |
|---|---|---|---|---|---|---|---|---|---|---|---|---|---|---|---|---|
| BLOCK 0: | | | | | | | | | | | | | | | | |
| J | K | E | B | E | B | E | B | E | B | E | B | E | B | E | E | Group0 |
| E | E | E | B | E | B | E | B | E | B | E | B | E | B | E | E | Group1 |
| E | E | E | B | E | B | E | B | E | B | E | B | E | B | E | E | Group2 |
| E | E | E | B | E | B | E | B | E | B | E | B | E | B | E | E | Group3 |
| E | E | E | B | E | B | E | B | E | B | E | B | E | B | E | E | Group4 |
| E | E | E | B | E | B | E | B | E | B | E | B | E | B | E | E | Group5 |
| E | E | E | B | E | B | E | B | E | B | E | B | E | B | E | E | Group6 |
| E | E | E | B | E | B | E | B | E | B | E | B | E | B | E | E | Group7 |
| BLOCK 1: | | | | | | | | | | | | | | | | |
| M | M | E | B | E | B | E | B | E | B | E | B | E | B | E | E | Group8 |
| E | E | E | B | E | B | E | B | E | B | E | B | E | B | E | E | Group9 |
| E | E | E | B | E | B | E | B | E | B | E | B | E | B | E | E | Group10 |
| E | E | E | B | E | B | E | B | E | B | E | B | E | B | E | E | Group11 |
| E | E | E | B | E | B | E | B | E | B | E | B | E | B | E | E | Group12 |
| E | E | E | B | E | B | E | B | E | B | E | B | E | B | E | E | Group13 |
| E | E | E | B | E | B | E | B | E | B | E | B | E | B | E | E | Group14 |
| E | E | E | B | E | B | E | B | E | B | E | B | E | B | E | E | Group15 |
| BLOCK 2: | | | | | | | | | | | | | | | | |
| D | D | E | B | E | B | E | B | E | B | E | B | E | B | E | E | Group16 |

TABLE 1A-continued

| | | | | | | | | | | | | | | | | |
|---|---|---|---|---|---|---|---|---|---|---|---|---|---|---|---|---|
| E | E | E | B | E | B | E | B | E | B | E | B | E | B | E | E | Group17 |
| E | E | E | B | E | B | E | B | E | B | E | B | E | B | E | E | Group18 |
| E | E | E | B | E | B | E | B | E | B | E | B | E | B | E | E | Group19 |
| E | E | E | B | E | B | E | B | E | B | E | B | E | B | E | E | Group20 |
| E | E | E | B | E | B | E | B | E | B | E | B | E | B | E | E | Group21 |
| E | E | E | B | E | B | E | B | E | B | E | B | E | B | E | E | Group22 |
| E | E | E | B | E | B | E | B | E | B | E | B | E | B | E | E | Group23 |
| BLOCK 3: | | | | | | | | | | | | | | | | |
| E | M | E | B | E | B | E | B | E | B | E | B | E | B | E | E | Group24 |
| E | E | E | B | E | B | E | B | E | B | E | B | E | B | E | E | Group25 |
| E | E | E | B | E | B | E | B | E | B | E | B | E | B | E | E | Group26 |
| E | E | E | B | E | B | E | B | E | B | E | B | E | B | E | E | Group27 |
| E | E | E | B | E | B | E | B | E | B | E | B | E | B | E | E | Group28 |
| E | E | E | B | E | B | E | B | E | B | E | B | E | B | E | E | Group29 |
| E | E | E | B | E | B | E | B | E | B | E | B | E | B | E | E | Group30 |
| E | E | E | B | E | B | E | B | E | B | E | B | E | B | E | E | Group31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel

| Line | Accession No. | Deposit Date |
|---|---|---|
| A129.5 | 40811 | May 25, 1990 |
| A133.1 | 40812 | May 25, 1990 |
| A144.1 | 40813 | May 25, 1990 |
| A200.7 | 40816 | May 31, 1990 |
| M3032.1 | 75021 | June 7, 1991 |
| M3094.4 | 75023 | June 7, 1991 |
| M3052.6 | 75024 | June 7, 1991 |
| M3007.4 | 75022 | June 7, 1991 |
| M3062.8 | 75025 | June 7, 1991 |
| M3028.10 | 75026 | June 7, 1991 |
| IMC130 | 75446 | April 16, 1993 |

TABLE II

| Symbol | Encoded (5 bit) | Description |
|---|---|---|
| 0 | 11110 | Data 0 |
| 1 | 01001 | Data 1 |
| 2 | 10100 | Data 2 |
| 3 | 10101 | Data 3 |
| 4 | 01010 | Data 4 |
| 5 | 01011 | Data 5 |
| 6 | 01110 | Data 6 |
| 7 | 01111 | Data 7 |
| 8 | 10010 | Data 8 |
| 9 | 10011 | Data 9 |
| A | 10110 | Data A |
| B | 10111 | Data B |
| C | 11010 | Data C |
| D | 11011 | Data D |
| E | 11100 | Data E |
| F | 11101 | Data F |
| I | 11111 | No Ethernet Carrier |
| S | 11001 | No Ethernet Data |
| V | 01100 | Unaligned Data |
| T | 01101 | Unassigned |
| J | 11000 | Frame Sync Part 1 |
| K | 10001 | Frame Sync Part 2 |
| Q | 00000 | Invalid |
| H | 00100 | Invalid |
| R | 00111 | Invalid |
| V | 00001 | Invalid |
| V | 00010 | Invalid |
| V | 00011 | Invalid |
| V | 00101 | Invalid |

TABLE II-continued

| Symbol | Encoded (5 bit) | Description |
|---|---|---|
| V | 00110 | Invalid |
| V | 01000 | Invalid |
| V | 10000 | Invalid |

TABLE III

| Channel | Bytes/ Frame | Bits/ Frame | Kbits/sec | Usage |
|---|---|---|---|---|
| JK | 1.0 | 8 | 64 | Frame Synchronization |
| B | 96.0 | 768 | 6,144 | Isochronous |
| E | 156.5 | 1,252 | 10,016 | Ethernet Packet |
| D | 1.0 | 8 | 64 | D channel |
| M | 1.5 | 12 | 96 | Maintenance |
| | 256.0 | 2,048 | 16,384 | Mbits/sec |

TABLE IV

Control Signals of FIG. 13

| Control Signal | Function |
|---|---|
| tax-test-ctrl | Enables data from diagnostics port into rx-buffer |
| rx-manage-enable | Diverts port data into diagnostics port |
| int-ctl | Marks the "control" status slot |
| int-iso | Marks the "isochronous" slot |
| latch-enable | Enable signal to latch I/O bit deserialized data in |
| rx-node-sell | Enable port data, into rx-buffer |
| quset-enable | Enables an "idle-pattern" to be loaded into rx-buffer |

TABLE V

Control Signals for FIG. 14

| Control Signal | Function |
|---|---|
| int-ctl | Identifies the "control/status" slot |
| int-idle | Identifies "idle" slot |
| int-iso | Enables transmit data serializing |
| shift-enable | Enables transmit data loading into serializer |
| load-enable | Enables transmit data loading into serializer |
| cascade | Indicates if port 1 is in cascade mode |
| tx-node-sel | Enable signal to load data from tx-buffer into tx-latch |
| IPE | Enables "idle pattern" to be transmitted |
| ETE-IA | To select between 2 idle patterns |
| CAS-address | Address (read or write) to access cascade RAM |
| CAS-RW | Read write bar signal for cascade RAM |
| CAS-enable | Chip select signal for cascade RAM |

TABLE VI

Isochronous Switching Device Modes of Operation

| Operating Mode | Port Selection | Data Switching |
|---|---|---|
| 1 | Regular | Between TSI ring and sixteen 6.144 Mbps ports |

TABLE VI-continued

Isochronous Switching Device Modes of Operation

| Operating Mode | Port Selection | Data Switching |
|---|---|---|
| 1 | Mixed | Between TSI ring and one 15.872 Mbps port plus thirteen 6.144 |
| 2 | Mixed | Mbps ports Between two TSI rings |

TABLE VII

TSI Ring Data Definition and Bandwidth

| Data Symbol | Type | Bandwidth |
|---|---|---|
| TSI Cycle Header | Contain the start delimiter and cycle information | 12 bytes per frame |
| IMC | Isochronous Maintenance Channel and resides within the cycle header | 64 Kbps or 3 bits per frame |
| Iso Slot | Isochronous data slot | 98 Mbps or 1536 slots per frame, where each slot is 8 bits |
| Data Packet Group | Packet data slot | .768 Mpbs or 12 slots per frame where each slot is 8 bits |

TABLE VIII (Regular Mode)

Data Buffer Loading Sequence According to Buffer Address

| Transmit Buffer | | | | Receive Buffer | | | |
|---|---|---|---|---|---|---|---|
| Buffer Address | Data in Buffer Location | Buffer Address | Data in Buffer Location | Buffer Address | Data in Buffer Location | Buffer Address | Data in Buffer Location |
| OH | IMC | 12H | TSI ring Slot 18 | 0H | | 12H | Port 2-B2 |
| 1H | TSI ring Slot 1 | 13H | TSI ring Slot 19 | 1H | Port 1-B1 | 13H | Port 3-B2 |
| 2H | TSI ring Slot 2 | 14H | TSI ring Slot 20 | 2H | Port 2-B1 | 14H | Port 4-B2 |
| 3H | TSI ring Slot 3 | | . | 3H | Port 3-B1 | | . |
| 4H | TSI ring Slot 4 | | . | 4H | Port 4-B1 | | . |
| 5H | TSI ring Slot 5 | | . | 5H | Port 5-B1 | | . |
| 6H | TSI ring Slot 6 | 515H | TSI ring Slot 1525 | 6H | Port 6-B1 | 515H | Port 5-B96 |
| 7H | TSI ring Slot 7 | 516H | TSI ring Slot 1526 | 7H | Port 7-B1 | 516H | Port 6-B96 |
| 8H | TSI ring Slot 8 | 517H | TSI ring Slot 1527 | 8H | Port 8-B1 | 517H | Port 7-B96 |
| 9H | TSI ring Slot 9 | 518H | TSI ring Slot 1528 | 9H | Port 9-B1 | 518H | Port 8-B96 |
| Ah | TSI ring Slot 10 | 519H | TSI ring Slot 1529 | Ah | Port 10-B1 | 5faH | Port 9-B96 |
| bH | TSI ring Slot 11 | 5faH | TSI ring Slot 1530 | BH | Port 11-B1 | 5fbH | Port 10-B96 |
| cH | TSI ring Slot 12 | 5fbH | TSI ring Slot 1531 | CH | Port 12-B1 | 5fcH | Port 11-B96 |
| dH | TSI ring Slot 13 | 5fcH | TSI ring Slot 1532 | DH | Port 13-B1 | 5fdH | Port 12-B96 |
| Eh | TSI ring Slot 14 | 5fdH | TSI ring Slot 1533 | Eh | Port 14-B1 | 5feH | Port 13-B96 |
| Fh | TSI ring Slot 15 | 5feH | TSI ring Slot 1534 | Fh | Port 15-B1 | 5ffH | Port 14-B96 |
| 10H | TSI ring Slot 16 | 5ffH | TSI ring Slot 1535 | 10H | Port 16-B1 | 600H | Port 15-B96 |
| 11H | TSI ring Slot 17 | 600H | TSI ring Slot 1536 | 11H | Port 1-B2 | 600H | Port 16-B96 |

TABLE IX

Mode 1 (Mixed Mode)
Data Buffer Loading Sequence According to Buffer Address

| Receive Buffer | | | | Transmit Buffer | |
|---|---|---|---|---|---|
| Buffer Address | Data in Buffer Location | Buffer Address | Data in Buffer Location | Buffer Address | Data in Buffer Location |
| OH | filler | 2aH | Port 10-B3 | OH | IMO |
| 1H | Port 1-B1 | 2hh | Port 11-B3 | 1H | TSI ring Slot 1 |
| 2H | Port 2-B1 | 2bH | Port 12-B3 | 2H | TSI ring Slot 2 |
| 3H | Port 3-B1 | 2dH | Port 13-B3 | 3H | TSI ring Slot 3 |
| 4H | Port 4-B1 | 2eH | Port 16-B5 | 4H | TSI ring Slot 4 |
| 5H | Port 5-B1 | 2fH | Port 16-B6 | 5H | TSI ring Slot 5 |
| 6H | Port 6-B1 | 30H | filler | 6H | TSI ring Slot 6 |
| 7H | Port 7-B1 | 31H | Port 1-B4 | 7H | TSI ring Slot 7 |
| 8H | Port 8-B1 | 32H | Port 2-B4 | 8H | TSI ring Slot 8 |
| 9H | Port 9-B1 | 33H | Port 3-B4 | 9H | TSI ring Slot 9 |
| Ah | Port 10-B1 | 34H | Port 4-B4 | Ah | TSI ring Slot 10 |
| bH | Port 11-B1 | 35H | Port 5-B4 | bH | TSI ring Slot 11 |
| Ch | Port 12-B1 | 36H | Port 6-B4 | Ch | TSI ring Slot 12 |
| Dh | Port 13-B1 | 37H | Port 7-B4 | Dh | TSI ring Slot 13 |
| Eh | Port 16-B1 | 38H | Port 8-B4 | Eh | TSI ring Slot 14 |
| Fh | Port 16-B2 | 39H | Port 9-B4 | Fh | TSI ring Slot 15 |
| 10H | filler | 3aH | Port 10-B4 | 10H | TSI ring Slot 16 |
| 11H | Port 1-B2 | 3bH | Port 11-B4 | 11H | TSI ring Slot 17 |
| 12H | Port 2-B2 | 3cH | Port 12-B4 | 12H | TSI ring Slot 18 |
| 13H | Port 3-B2 | 3dH | Port 13-B4 | 13H | TSI ring Slot 12 |
| 14H | Port 4-B2 | 3eH | Port 16-B7 | 14H | TSI ring Slot 20 |
| | | 3fH | Port 16-B8 | | |
| | | 40H | Port 16-B9 | | |
| 15H | Port 5-B2 | 3fH | Port 16-B9 | 15H | TSI ring Slot 21 |
| 16H | Port 6-B2 | 40H | Port 16-B10 | 16H | TSI ring Slot 22 |
| 17H | Port 7-B2 | | . | | . |
| 18H | Port 8-B2 | | . | | . |
| 19H | Port 9-B2 | | . | | . |
| 1aH | Port 10-B2 | 5f1H | Port 1-B96 | 5f4H | TSI ring Slot 1524 |
| 1bH | Port 11-B2 | 5f2H | Port 2-B96 | 5f5H | TSI ring Slot 1525 |
| 1cH | Port 12-B2 | 5f3H | Port 3-B96 | 5f6H | TSI ring Slot 1526 |
| 1dH | Port 13-B2 | 5f4H | Port 4-B96 | 5f7H | TSI ring Slot 1527 |
| 1eH | Port 16-B3 | 5f5H | Port 5-B96 | 5f8H | TSI ring Slot 1528 |
| 1fH | Port 16-B4 | 5f5H | Port 6-B96 | 5f9H | TSI ring Slot 1529 |
| 20H | filler | 5f7H | Port 7-B96 | 5faH | TSI ring Slot 1530 |
| 21H | Port 1-B3 | 5f8H | Port 8-B96 | 5fbH | TSI ring Slot 1531 |
| 22H | Port 2-B3 | 5f9H | Port 9-B96 | 5fcH | TSI ring Slot 1532 |
| 23H | Port 3-B3 | 5faH | Port 10-B96 | 5fdH | TSI ring Slot 1533 |
| 24H | Port 4-B3 | 5fbH | Port 11-B96 | 5feH | TSI ring Slot 1534 |
| 25H | Port 5-B3 | 5fcH | Port 12-B96 | 5ffH | TSI ring Slot 1535 |
| 26H | Port 6-B3 | 5fdH | Port 13-B96 | 600H | TSI ring Slot 1536 |
| 27H | Port 7-B3 | 5feH | Port 16-B247 | | |
| 28H | Port 8-B3 | 5ffH | Port 16-B248 | | |
| 29H | Port 9-B3 | 600H | filler | | |

TABLE X

| Signal Name | Description |
|---|---|
| RXI+, RXI− | Twisted pair receive inputs |
| TXOP−, TXO−, TXO+, TXOP+ | Twisted pair transmit outputs |
| TXD | Transmit Data input. Serial NRZ data input from the controller. |
| TXE | Transmit Enable |
| TXC | Transmit Clock. A 10 Mhz clock derived from the 20 Mhz ECLK input. |
| COL | Collision Detect output. Generates and active high signal when the transceiver function of the physical layer portion detects a collision |
| RXD | Receive Data Output |
| RXC | Receive clock |
| CRS | Carrier Sense |
| ECRS | Early carrier sense. In mixed configuration, this signal goes active when valid data has reached the input of the Ethernet receive FIFO |

TABLE X-continued

| Signal Name | Description |
|---|---|
| LCLK | Link Clock. Used by the transmit circuits as the bit level clock for data encoding upon the isochronous/ethernet link. |
| ECLK | Ethernet clock. Used to encode data when the physical layer portion is operating in 10 Base T mode. |
| IRFS | Isochronous Receive frame synch. This output marks the beginning of a receive frame cycle. |
| IRXD | Isochronous receive data |
| IRXE | Isochronous receive enable |
| IFR | Isochronous Frame reference |
| ITFS | Isochronous transmit frame synch. Marks the beginning of a transmit frame cycle. |
| ITXD | Isochronous Transmit data |

What is claimed is:

1. In a data communication network for communicating data between a plurality of data stations over a communications medium under control of a processor which outputs a plurality of control signals, apparatus comprising:

a receive memory means and a transmit memory means;

a receive datapath corresponding to each data station coupled between said communications medium and said receive memory means for providing at least some data received over said communications medium to said receive memory means;

a transmit datapath corresponding to each data station coupled between said transmit memory means and said communications medium for providing at least some data from said transmit memory means to said communications medium;

each said receive datapath including:

a deserializer configured to receive serial data from said communications medium and output at least a portion of said received serial data in parallel;

means for selectively transmitting, in response to one of said plurality of control signals, said data output by said deserializer to said receive memory means;

each said transmit datapath including a serializer configured to receive parallel data and output serial data.

2. Apparatus, as claimed in claim 1, wherein each of said receiver memory means and said transmit memory means is a buffer.

3. Apparatus, as claimed in claim 1, wherein said data received over said communications medium includes status data indicating at least a status of port activities.

4. Apparatus, as claimed in claim 1, wherein said data received over said communications medium comprises status data including at least a status of interrupts of at least one of said data stations and wherein each said receive datapath includes a demultiplexer coupled between said communications path and said deserializer for diverting said status data to a first location prior to receipt of serial data in said deserializer.

5. Apparatus, as claimed in claim 4, wherein said first location comprises a first register.

6. Apparatus, as claimed in claim 5, wherein said apparatus is contained in a first network data station, coupled, via said communications medium, to a plurality of other data stations and wherein said first register stores status data from all said other data stations which are connected to said first network data station.

7. Apparatus, as claimed in claim 1, wherein said transmit datapath includes means for generating at least one predetermined data pattern for transmission onto said communications medium.

8. Apparatus, as claimed in claim 7, wherein said means for generating includes means for generating a plurality of predetermined data patterns and means for selecting among said plurality of data patterns in response to one of said plurality of control signals.

9. Apparatus, as claimed in claim 1, wherein said data stations include at least first and second network data stations, and said apparatus is contained in said first network data station, which is coupled, via said communications medium, to a first plurality of other data stations and also coupled, by said apparatus, via said communications medium, to said second network data station which is coupled to a second plurality of data stations and wherein:

said transmit datapath includes a first-in-first-out buffer for receiving data from said transmit memory means and holding said data before providing said data to said serializer.

10. Apparatus, as claimed in claim 9, wherein said first network data station is coupled to said second network data station by physical layer circuitry which multiplexes data for transmission from said first and second network data stations onto said communications medium and demultiplexes said data received over said communications medium.

11. Apparatus, as claimed in claim 9, further comprising means for determining whether said serializer receives parallel data from said first-in-first-out buffer or from said transmit memory means, bypassing said first-in-first-out buffer.

12. Apparatus, as claimed in claim 9, wherein said first network data station includes a number of receive data paths at least equal to the number of data stations in said first plurality of data stations, and wherein operation of all of the receive datapaths in said first network data station are synchronous.

13. Apparatus, as claimed in claim 9, wherein said first-in-first-out buffer is configured to output its contents to said serializer in response to a signal transmitted by said second network data station.

14. In a data communication network for communicating between data stations over a communications medium under control of a processor which outputs a plurality of control signals, apparatus comprising:

a receive memory device and a transmit memory device;

a plurality of receive datapaths for providing at least some data received over said media to said receive memory device;

a plurality of transmit datapaths for providing at least some data from said transmit memory device to said communications medium;

each of said receive datapaths including a deserializer configured to receive serial data and output at least a portion of said received serial data in parallel;

a latch which, in response to one of said plurality of control signals, controllably provides said data output by said deserializer to said receive memory device;

each of said transmit datapaths including a serializer configured to receive parallel data and output serial data.

15. In a data communication network for communicating data between data stations over a communications medium, said network including at least first and second network data stations, said first network data station coupled to a first plurality of said data stations and also coupled to said second network data station, said second network data station being coupled to a second plurality of said data stations, said first network data station comprising:

a receive memory device and a transmit memory device;

a receive datapath coupled between said communications medium and said receive memory means for providing at least some data received over said media to said receive memory device;

a transmit datapath coupled between said transmit memory means and said communications medium for providing at least some data from said transmit memory device to said communications medium;

a first-in-first-out buffer coupled to said first network data station for receiving data from said transmit memory device and holding said data before providing said data to said second network data station; and wherein said first-in-first-out buffer is configured to output its contents in response to a signal transmitted by said second network data station.

*16. In a data communication network for communicating isochronous and non-isochronous data between data stations over a communications medium under control of a processor which outputs a plurality of control signals, an apparatus comprising:*

*a receive memory and a transmit memory;*

*one or more receive datapaths for providing at least some data received over the communications medium to the receive memory;*

*one or more transmit datapaths for providing at least some data from the transmit memory to the communications medium;*

*each of the receive datapaths including*

*a deserializer configured to receive serial data and output at least a portion of the received serial data in parallel;*

*a latch which, in response to one of the plurality of control signals, controllably provides the data output by the deserializer to the receive memory;*

*each of the transmit datapaths including a serializer configured to receive parallel data and output serial data.*

*17. The apparatus of claim 16, wherein the isochronous data comprises data output from a telephone device.*

*18. The apparatus of claim 16, wherein the isochronous data comprises data output from a video device.*

*19. The apparatus of claim 16, wherein the non-isochronous data comprises packetized data.*

*20. The apparatus of claim 16, wherein the non-isochronous data comprises ethernet data.*

*21. The apparatus of claim 16, wherein the communications medium comprises a plurality of physical media.*

*22. The apparatus of claim 21, wherein at least one of the physical media communicates isochronous data and at least one of the physical media communicates non-isochronous data.*

*23. The apparatus of claim 16, wherein apparatus comprises at least a portion of a star-topology network.*

*24. The apparatus of claim 16, wherein the apparatus comprises at least a portion of a ring topology network.*

*25. The apparatus of claim 16, wherein the apparatus comprises at least a portion of a tree topology network.*

*26. The apparatus of claim 16, wherein the non-isochronous data received by the apparatus is coupled to hub circuitry for processing the non-isochronous data.*

*27. The apparatus of claim 26, wherein the non-isochronous data comprises ethernet data.*

*28. The apparatus of claim 16, wherein isochronous data received by the apparatus is coupled to a high bandwidth bus.*

*29. The apparatus of claim 28, wherein the isochronous data is coupled to the high bandwidth bus by an isochronous controller.*

*30. The apparatus of claim 29, wherein the isochronous controller comprises a time slot interchange interface.*

*31. The apparatus of claim 29, wherein the isochronous controller comprises an isochronous switching device.*

*32. The apparatus of claim 29, wherein the isochronous controller includes a local loopback communication path.*

*33. The apparatus of claim 16, wherein the data communicated over the communications medium further comprises maintenance data.*

*34. The apparatus of claim 33, wherein the maintenance data comprises M channel data.*

*35. The apparatus of claim 16, wherein data communicated over the communications medium further comprises signaling data.*

*36. The apparatus of claim 35, wherein the signaling data comprises D channel data.*

*37. The apparatus of claim 35, wherein the signaling data is coupled to at least one signaling processor.*

*38. The apparatus of claim 35, wherein the signaling data is coupled to a remote network data station and controls a communications medium coupled to the remote network data station.*

*39. The apparatus of claim 35, wherein the signaling data is generated or processed by a signaling processor.*

*40. The apparatus of claim 16, wherein data communicated over the communications medium comprises signaling and/or maintenance data, wherein the signaling and/or maintenance data comprises data selected from the group consisting of error condition data, requested connection data, maintenance data, and control data.*

*41. The apparatus of claim 16, wherein the isochronous and non-isochronous data are multiplexed and coupled to a time division multiplexed bus.*

*42. The apparatus of claim 16, wherein the isochronous and non-isochronous data are coupled to/from the communications medium through a multiplexer/demultiplexer.*

*43. The apparatus of claim 16, wherein the apparatus further comprises a cascade port, wherein the cascade port is coupled between first and second isochronous hubs without using a backbone network.*

*44. The apparatus of claim 16, wherein the communications medium comprises a portion of a local area network.*

*45. The apparatus of claim 16, wherein the communications medium comprises a portion of a wide area network.*

*46. The apparatus of claim 16, wherein the plurality of control signals control the apparatus.*

*47. The apparatus of claim 46, wherein the data is coupled to/from the communications medium through a plurality of physical layer devices.*

*48. The apparatus of claim 47, wherein the processor communicates with one or more of the physical layer devices.*

*49. The apparatus of claim 47, wherein the processor communicates with each of the physical layer devices.*

*50. The apparatus of claim 48, wherein the processor requests status information from a physical layer device.*

*51. The apparatus of claim 48, wherein the processor requests status information from a physical layer device by providing a physical layer device address.*

*52. The apparatus of claim 47, further comprising a register for receiving status information for one or more of the physical layer devices.*

*53. The apparatus of claim 47, wherein the processor receives an interrupt in the event of an activity change of a physical layer device.*

*54. The apparatus of claim 47, wherein the processor receives signaling data.*

*55. The apparatus of claim 48, wherein the processor receives an interrupt that indicates that a signaling channel receiver or transmitter of a physical layer device needs to be processed by the processor.*

*56. The apparatus of claim 16, wherein data communicated to/from the communications medium is coupled to an HDLC controller.*

*57. The apparatus of claim 56, wherein the data coupled to the HDLC controller comprises signaling data.*

*58. In a data communication network for communicating isochronous and non-isochronous data between data stations over a communications medium including at least first and second network data stations, the first network data station being coupled to one or more first data stations and*

*also coupled to the second network data station, the second network data station being coupled to one or more second data stations, the first network data station comprising:*

*a receive memory and a transmit memory;*

*a receive datapath coupled between the communications medium and the receive memory, wherein the receive datapath provides at least some data received over the communications medium to the receive memory;*

*a transmit datapath coupled between the transmit memory and the communications medium wherein the transmit datapath provides at least some data from the transmit memory to the communications medium;*

*a first-in-first-out buffer receiving the at least some data from the transmit memory and holding the data before communicating the data to the second network data station; and*

*wherein the first-in-first-out buffer is configured to output its contents in response to a signal transmitted by the second network data station.*

*59. The apparatus of claim 58, wherein the isochronous data comprises data output from a telephone device.*

*60. The apparatus of claim 58, wherein the isochronous data comprises data output from a video device.*

*61. The apparatus of claim 58, wherein the non-isochronous data comprises packetized data.*

*62. The apparatus of claim 58, wherein the non-isochronous data comprises ethernet data.*

*63. The apparatus of claim 58, wherein the communications medium comprises a plurality of physical media.*

*64. The apparatus of claim 63, wherein at least one of the physical media communicates isochronous data and at least one of the physical media communicates non-isochronous data.*

*65. The apparatus of claim 58, wherein the first and second network data stations form at least a portion of a star-topology network.*

*66. The apparatus of claim 58, wherein the first and second network data stations form at least a portion of a ring topology network.*

*67. The apparatus of claim 58, wherein the first and second network data stations form at least a portion of a tree topology network.*

*68. The apparatus of claim 58, wherein non-isochronous data received by the first network data station is coupled to hub circuitry for processing the non-isochronous data.*

*69. The apparatus of claim 68, wherein the non-isochronous data comprises ethernet data.*

*70. The apparatus of claim 58, wherein the isochronous data received by the first network data station is coupled to a high bandwidth bus.*

*71. The apparatus of claim 70, wherein the isochronous data is coupled to the high bandwidth bus by an isochronous controller.*

*72. The apparatus of claim 71, wherein the isochronous controller comprises a time slot interchange interface.*

*73. The apparatus of claim 71, wherein the isochronous controller comprises an isochronous switching device.*

*74. The apparatus of claim 71, wherein the isochronous controller includes a local loopback communication path.*

*75. The apparatus of claim 58, wherein data communicated over the communications medium further comprises maintenance data.*

*76. The apparatus of claim 75, wherein the maintenance data comprises M channel data.*

*77. The apparatus of claim 58, wherein data communicated over the communications medium further comprises signaling data.*

*78. The apparatus of claim 77, wherein the signaling data comprises D channel data.*

*79. The apparatus of claim 77, wherein the signaling data is coupled to at least one signaling processor.*

*80. The apparatus of claim 77, wherein the signaling data is coupled to the second network data station and controls a communications medium coupled to the second network data station.*

*81. The apparatus of claim 77, wherein the signaling data is generated or processed by a signaling processor.*

*82. The apparatus of claim 58, wherein data communicated over the communications medium comprises signaling and/or maintenance data, wherein the signaling and/or maintenance data comprises data selected from the group consisting of error condition data, requested connection data, maintenance data, and control data.*

*83. The apparatus of claim 58, wherein the isochronous and non-isochronous data are multiplexed and coupled to a time division multiplexed bus.*

*84. The apparatus of claim 58, wherein the isochronous and non-isochronous data are coupled to/from the communications medium through a multiplexer/demultiplexer.*

*85. The apparatus of claim 58, wherein the first-in-first-out buffer is coupled to a cascade port, wherein the cascade port is coupled between first and second isochronous hubs without using a backbone network.*

*86. The apparatus of claim 58, wherein the communications medium comprises a portion of a local area network.*

*87. The apparatus of claim 58, wherein the communications medium comprises a portion of a wide area network.*

*88. The apparatus of claim 58, wherein the first network data station further comprises a processor, wherein the processor outputs a plurality of control signals for controlling the first network data station.*

*89. The apparatus of claim 88, wherein the data is coupled to/from the communications medium through a plurality of physical layer devices.*

*90. The apparatus of claim 89, wherein the processor communicates with one or more of the physical layer devices.*

*91. The apparatus of claim 89, wherein the processor communicates with each of the physical layer devices.*

*92. The apparatus of claim 90, wherein the processor requests status information from a physical layer device.*

*93. The apparatus of claim 90, wherein the processor requests status information from a physical layer device by providing a physical layer device address.*

*94. The apparatus of claim 89, further comprising a register for receiving status information for one or more of the physical layer devices.*

*95. The apparatus of claim 89, wherein the processor receives an interrupt in the event of an activity change of a physical layer device.*

*96. The apparatus of claim 89, wherein the processor receives signaling data.*

*97. The apparatus of claim 90, wherein the processor receives an interrupt that indicates that a signaling channel receiver or transmitter of a physical layer device needs to be processed by the processor.*

*98. The apparatus of claim 58, wherein data communicated to/from the communications medium is coupled to an HDLC controller.*

*99. The apparatus of claim 97, wherein the data coupled to the HDLC controller comprises signaling data.*

*100. In a data communication network for communicating isochronous and non-isochronous data between data stations over a communications medium including at least first*

*and second network data stations, the first network data station being coupled to one or more first data stations and also coupled to the second network data station, the second network data station being coupled to one or more second data stations, a method comprising the steps of:*

*storing data received from the communications medium in a receive memory of the first network data station;*

*providing data stored in a transmit memory of the first network data station to the communications medium, wherein data received from the transmit memory is buffered with a first-in-first-out buffer, wherein the data is held by the first-in-first-out buffer before the data is communicated to the second network data station; and*

*wherein the first-in-first-out buffer is configured to output its contents in response to a signal transmitted by the second network data station.*

*101. The method of claim 100, wherein the isochronous data comprises data output from a telephone device.*

*102. The method of claim 100, wherein the isochronous data comprises data output from a video device.*

*103. The method of claim 100, wherein the non-isochronous data comprises packetized data.*

*104. The method of claim 100, wherein the non-isochronous data comprises ethernet data.*

*105. The method of claim 100, wherein the communications medium comprises a plurality of physical media.*

*106. The method of claim 105, wherein at least one of the physical media communicates isochronous data and at least one of the physical media communicates non-isochronous data.*

*107. The method of claim 100, wherein the first and second network data stations form at least a portion of a star-topology network.*

*108. The method of claim 100, wherein the first and second network data stations form at least a portion of a ring topology network.*

*109. The method of claim 100, wherein the first and second network data stations form at least a portion of a tree topology network.*

*110. The method of claim 100, wherein non-isochronous data received by the first network data station is coupled to hub circuitry for processing the non-isochronous data.*

*111. The method of claim 110, wherein the non-isochronous data comprises ethernet data.*

*112. The method of claim 100, wherein the isochronous data received by the first network data station is coupled to a high bandwidth bus.*

*113. The method of claim 112, wherein the isochronous data is coupled to the high bandwidth bus by an isochronous controller.*

*114. The method of claim 113, wherein the isochronous controller comprises a time slot interchange interface.*

*115. The method of claim 113, wherein the isochronous controller comprises an isochronous switching device.*

*116. The method of claim 113, wherein the isochronous controller includes a local loopback communication path.*

*117. The method of claim 100, wherein data communicated over the communications medium further comprises maintenance data.*

*118. The method of claim 117, wherein the maintenance data comprises M channel data.*

*119. The method of claim 100, wherein data communicated over the communications medium further comprises signaling data.*

*120. The method of claim 119, wherein the signaling data comprises D channel data.*

*121. The method of claim 119, wherein the signaling data is coupled to at least one signaling processor.*

*122. The method of claim 119, wherein the signaling data is coupled to the second network data station and controls a communications medium coupled to the second network data station.*

*123. The method of claim 119, wherein the signaling data is generated or processed by a signaling processor.*

*124. The method of claim 100, wherein data communicated over the communications medium comprises signaling and/or maintenance data, wherein the signaling and/or maintenance data comprises data selected from the group consisting of error condition data, requested connection data, maintenance data, and control data.*

*125. The method of claim 100, wherein the isochronous and non-isochronous data are multiplexed and coupled to a time division multiplexed bus.*

*126. The method of claim 100, wherein the isochronous and non-isochronous data are coupled to/from the communications medium through a multiplexer/demultiplexer.*

*127. The method of claim 100, wherein the first-in-first-out buffer is coupled to a cascade port, wherein the cascade port is coupled between first and second isochronous hubs without using a backbone network.*

*128. The method of claim 100, wherein the communications medium comprises a portion of a local area network.*

*129. The method of claim 100, wherein the communications medium comprises a portion of a wide area network.*

*130. The method of claim 100, wherein the first network data station further comprises a processor, wherein the processor outputs a plurality of control signals for controlling the first network data station.*

*131. The method of claim 130, wherein the data is coupled to/from the communications medium through a plurality of physical layer devices.*

*132. The method of claim 131, wherein the processor communicates with one or more of the physical layer devices.*

*133. The method of claim 131, wherein the processor communicates with each of the physical layer devices.*

*134. The method of claim 132, wherein the processor requests status information from a physical layer device.*

*135. The method of claim 132, wherein the processor requests status information from a physical layer device by providing a physical layer device address.*

*136. The method of claim 131, further comprising a register for receiving status information for one or more of the physical layer devices.*

*137. The method of claim 131, wherein the processor receives an interrupt in the event of an activity change of a physical layer device.*

*138. The method of claim 131, wherein the processor receives signaling data.*

*139. The method of claim 131, wherein the processor receives an interrupt that indicates that a signaling channel receiver or transmitter of a physical layer device needs to be processed by the processor.*

*140. The method of claim 100, wherein data communicated to/from the communications medium is coupled to an HDLC controller.*

*141. The method of claim 140, wherein the data coupled to the HDLC controller comprises signaling data.*

* * * * *